US012067817B2

(12) United States Patent
Clasen et al.

(10) Patent No.: US 12,067,817 B2
(45) Date of Patent: Aug. 20, 2024

(54) IGNITION COIL FOR INTERNAL COMBUSTION ENGINE

(71) Applicant: Briggs & Stratton, LLC, Wauwatosa, WI (US)

(72) Inventors: Kyle Clasen, Hartland, WI (US); Daniel Roche, Oconomowoc, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 18/135,439

(22) Filed: Apr. 17, 2023

(65) Prior Publication Data

US 2023/0343154 A1 Oct. 26, 2023

Related U.S. Application Data

(60) Provisional application No. 63/332,948, filed on Apr. 20, 2022.

(51) Int. Cl.

| | |
|---|---|
| ***F02P 5/00*** | (2006.01) |
| ***F02P 3/04*** | (2006.01) |
| ***F02P 5/15*** | (2006.01) |
| ***G07C 5/08*** | (2006.01) |

(52) U.S. Cl.

CPC .............. *G07C 5/0825* (2013.01); *F02P 3/04* (2013.01); *F02P 5/1502* (2013.01)

(58) Field of Classification Search

CPC ........... F02P 15/12; F02P 9/005; Y02T 10/40; B60W 10/06; G01D 11/28; F02D 37/02

USPC ..................................................... 123/406.12

See application file for complete search history.

(56) References Cited

U.S. PATENT DOCUMENTS

| | | | | |
|---|---|---|---|---|
| 4,940,965 A * | 7/1990 | Umehara | B21C 3/00 | 340/517 |
| 4,982,717 A * | 1/1991 | Okuda | F02P 11/02 | 123/603 |
| 4,998,521 A * | 3/1991 | Inoue | F02P 5/106 | 123/406.12 |
| 5,161,503 A * | 11/1992 | Yano | F02B 61/02 | 477/107 |
| 10,393,086 B2 | 8/2019 | Koenen et al. | | |
| 10,514,014 B2 | 12/2019 | Koenen et al. | | |
| 2002/0013654 A1* | 1/2002 | Masters | B25J 9/16 | 701/115 |
| 2016/0195027 A1* | 7/2016 | Mori | F01L 3/06 | 123/309 |

* cited by examiner

*Primary Examiner* — Long T Tran
*Assistant Examiner* — James J Kim
(74) *Attorney, Agent, or Firm* — Foley & Lardner LLP

(57) ABSTRACT

An ignition coil includes an ignition circuit having a first winding and a second winding, a controller in communication with the ignition circuit, and a light. The ignition circuit is configured to output an ignition timing signal. The controller is configured to establish a rule that limits an engine speed to a maximum engine speed to be provided by the ignition timing signal. The light is configured to illuminate and indicate the maximum engine speed in response to an output signal from the controller.

20 Claims, 17 Drawing Sheets

IGNITION COIL FOR INTERNAL COMBUSTION ENGINE

CROSS-REFERENCE TO RELATED PATENT APPLICATIONS

This application claims the benefit of and priority to U.S. Provisional Application No. 63/332,948, filed on Apr. 20, 2022, the entire disclosure of which is hereby incorporated by reference herein.

BACKGROUND

In regulated engine performance applications, such as racing applications where engine components are often standardized between participants, modifications (e.g., aftermarket modifications) that de-standardize the engine may yield an advantage or disadvantage for the operator of the modified engine. For example, modifications or substitutions to systems and components associated with the engine (e.g., a modification to or a substitution of an ignition coil, a carburetor, a spark plug, a cylinder head, fuel injector, emissions sensor, etc.) may impact the performance of the engine.

SUMMARY

At least one embodiment relates to ignition coil for an internal combustion engine. The ignition coil includes an ignition circuit having a first winding and a second winding, a controller in communication with the ignition circuit, and a light. The ignition circuit is configured to output an ignition timing signal. The controller is configured to establish a rule that limits an engine speed to a maximum engine speed to be provided by the ignition timing signal. The light is configured to illuminate and indicate the maximum engine speed in response to an output signal from the controller.

Another embodiment relates to an engine. The engine includes an engine block having a cylinder defining a cylinder axis, a crankshaft defining a crankshaft axis, a piston configured to reciprocate along the cylinder axis and drive the crankshaft about the crankshaft axis, a flywheel coupled to the crankshaft and having a magnet, and an ignition system configured to generate a spark. The ignition system includes an ignition circuit having a first winding and a second winding, an indicator, and a controller in communication with the first winding. The ignition circuit is configured to output an ignition timing signal. The first winding is positioned proximate the flywheel. The controller is configured to establish a rule that limits an engine speed to a maximum engine speed to be provided by the ignition timing signal, and present, via the indicator, information regarding the maximum engine speed to be provided by the ignition timing signal.

Another embodiment relates to a method for operating an engine. The method includes establishing, via a processing circuit of an ignition coil, a rule for limiting an engine speed to a setpoint value, presenting, via a user interface of the ignition coil, information regarding the setpoint value, and operating, via the processing circuit of the ignition coil, an ignition circuit based on the setpoint value. The ignition circuit is configured to generate an ignition signal.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, in which.

DETAILED DESCRIPTION

Figure 1:
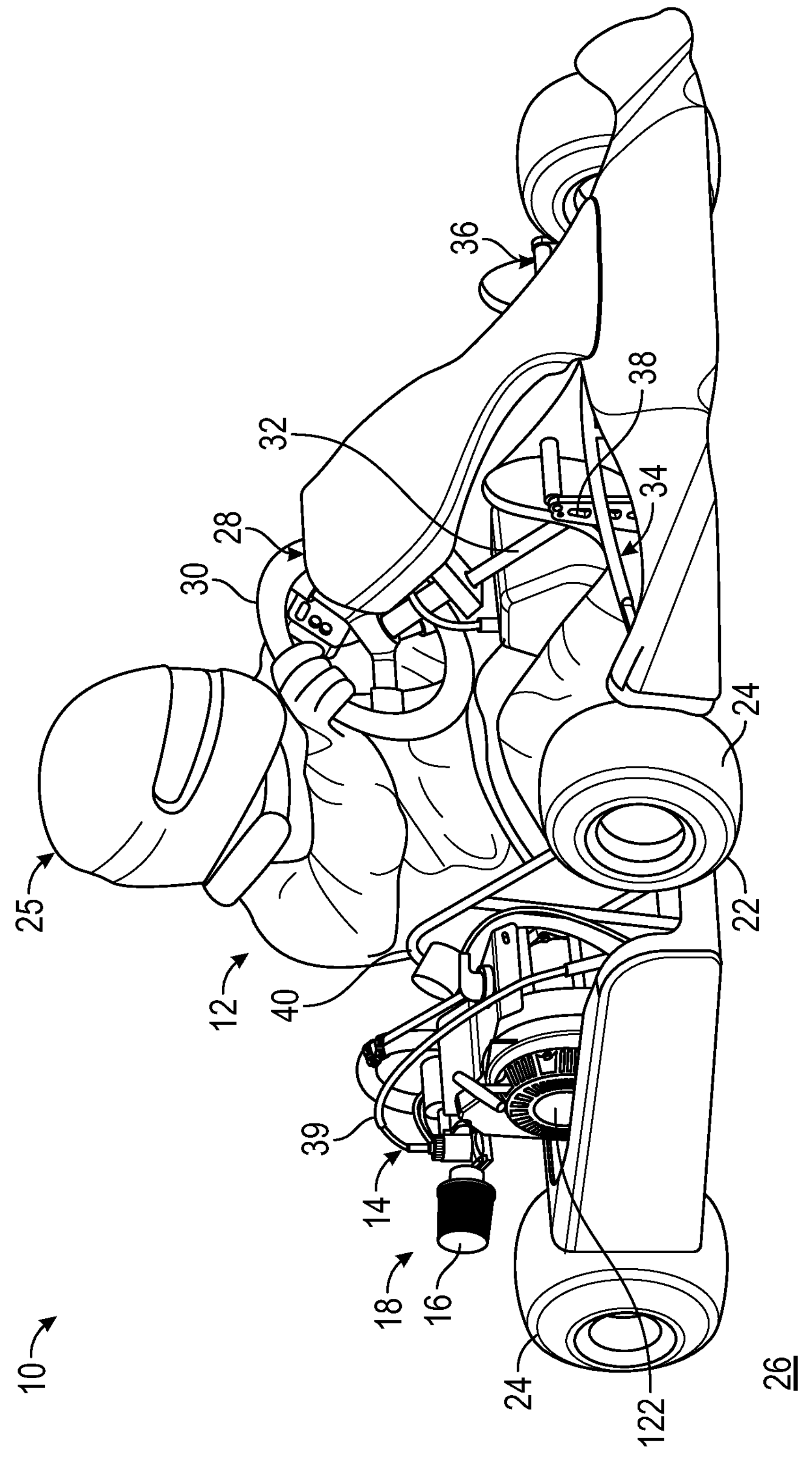
FIG. 1 is a perspective view of a kart, according to some embodiments.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, described herein are systems and methods for determining a state of engine equipment. In racing applications, participants typically abide by a set of rules and regulations that constrain the design of racing equipment. Common constraints for racing applications are related to engine performance, for example, an engine displacement (e.g., 49 cubic centimeter, 204 cubic centimeter, 500 cubic centimeter, etc.), an output power (e.g., 8.8 horsepower, 10 horsepower, 5 horsepower, 100 horsepower, etc.), a maximum engine speed (e.g., 6,100 rotations per minute, 4,000 rotations per minute, etc.), a particular engine make and model (e.g., a Briggs & Stratton® 206 racing engine), a number of engine cylinders (e.g., 1, 2, 3, 4, 6, 8, 10, 12, etc.), a configuration of cylinders (e.g., V-twin configuration, inline configuration, boxer configuration), a fuel type (e.g., 87 Octane, 91 Octane, etc.), and other factors.

Engine equipment can be interchangeable within an engine, and a user of an engine may implement different engine equipment to comply or not comply with different rules and regulations. By way of example, a user may install an ignition system configured to achieve a target engine output characteristic to comply with rules associated with a first race, and may install a different ignition system configured to achieve a different target engine output characteristic to comply with rules for a second race. Because engine equipment is susceptible to modification, verifying compliance with rules and regulations can be difficult and burdensome. Further, some engine equipment (e.g., aftermarket engine equipment) can be designed or implemented to increase the difficulty of detecting non-compliant engine modifications. Advantageously, the systems and methods described herein can provide an improved engine compliance verification process by facilitating an efficient and reliable engine inspection and analysis. According to an exemplary embodiment, a compliance verification system of the present disclosure facilitates an improved inspection and analysis of an engine by providing an indication of the current configuration and performance settings of the engine equipment. According to an exemplary embodiment, the compliance verification system is an ignition system that can be retrofit or provided on any spark-ignition combustion engine. According to an exemplary embodiment, the engine compliance verification system eliminates the need to conduct labor-intensive engine inspection and analysis tasks, and prevents disallowed engine modifications from going undetected.

Overall Machine

As shown in FIG. 1, a machine (e.g., a vehicle, a transit vehicle, a racing vehicle, outdoor power equipment, off-road equipment, recreational equipment, sports equipment, etc.), shown as kart 10, includes a driveline 12. Generally, the driveline 12 includes a fuel system 14 (e.g., fueling system, fuel supply system, gasoline supply system, gas supply system, etc.), a prime mover, shown as engine 100, an inflow system, shown as air supply system 18, and an outflow system, shown as exhaust system 20. In some embodiments, the engine 100 is configured to consume a fuel (e.g., gasoline, propane, compressed natural gas, nitromethane, methanol, oil-fuel mixture, etc.) provided by the fuel system 14 to power the kart 10.

In some embodiments, the kart 10 may include a support (e.g., frame, chassis, etc.), shown as chassis 22, supported by one or more tractive elements (e.g., wheels, tracks, snowmobile tracks, etc.), shown as wheels 24. The chassis 22 may be supported by two or more wheels 24 that are rotatably coupled to the chassis 22. The wheels 24 may be coupled to the chassis 22 through a suspension (e.g., an independent suspension, an air suspension, a rigid suspension, etc.). The wheels 24 may be configured to engage a surface (e.g., a road, a track, dirt, sand, gravel, etc.), shown as track 26, below the kart 10 to facilitate motion (e.g., acceleration, deceleration, steering, forward motion, etc.) of the kart 10. The wheels 24 may be collectively or independently coupled to an axle and may be configured to rotate independently of one another. For example, the kart 10 may include a differential and/or separate axles coupled to each of the wheels 24. In some embodiments, the kart 10 has at least one rear wheel 24 and at least one front wheel 24. The at least one rear wheel 24 and/or the at least one front wheel 24 may be rotatably powered by the engine 100 (e.g., via a belt or chain coupled to an axle of the at least one rear wheel 24). In some embodiments, one or more of the wheels 24 are at least partially driven by an electric motor (e.g., a wheel motor, a hub motor, etc.). In some embodiments, the at least one front wheel 24 is coupled to a steering assembly, shown as steering assembly 28. The steering assembly 28 may include a steering input (e.g., a handlebar, a wheel, etc.), shown as steering wheel 30 coupled to a steering column 32. The steering wheel 30 may be configured to facilitate a user of the kart 10 providing a steering input to steer the kart 10. The steering wheel 30 may be coupled to the one or more front wheels 24 to facilitate a user steering the kart 10. The steering column 32 may be configured to convert and transmit rotational motion of the steering wheel 30 into a pivoting motion of the one or more front wheels 24.

In some embodiments, the kart 10 includes an operator interface (e.g., control panel, user interface, etc.), shown as operator area 25 that facilitates an operator controlling one or more functions of the kart 10. In some embodiments, the operator controls may include an accelerator assembly 34 and a decelerator assembly 36. The accelerator assembly 34 may include an actuator (e.g., a pedal, a button, a switch, a touch sensitive surface, a handlebar throttle, etc.) coupled to the engine 100 (e.g., by a wire, by a cable, by a linkage, by a rigid member, etc.) and may be configured to control an operating characteristic of the engine 100 (e.g., rotational speed, power output, etc.) and/or a transmission of the driveline 12. For example, the accelerator assembly 34 may be coupled to a valve of the fuel system 14 (e.g., a butterfly valve, a valve of the carburetor 16, etc.) configured to regulate a flow of air-fuel mixture into the engine 100 and the rate of fuel supplied to the engine 100 can regulate the speed of the engine 100. For example, the accelerator pedal 38 may be coupled to an air fuel mixing device, shown as carburetor 16, via a cable 39. In some embodiments, the accelerator assembly 34 is coupled to a fuel injector (e.g., a direct fuel injector, electronic fuel injector, etc.) and may regulate the spray of fuel into an air flow into the engine 100. In some embodiments, the decelerator assembly 36 can include an actuator (e.g., a pedal, button, lever, switch, etc.) coupled to a braking mechanism having a friction element configured to absorb energy associated with the rotation of the crankshaft 110 of the engine (e.g., a rotation of one or more wheels 24). In some embodiments, the decelerator assembly 36 may be or include a disc brake, a drum brake, a hydraulic brake, a pneumatic brake, or other suitable brake mechanism. The decelerator assembly 36 may include a friction element configured to be mechanically forced against a surface to generate friction to slow or prevent a rotation of an associated wheel 24 or other component of the engine 100.

Figure 2:
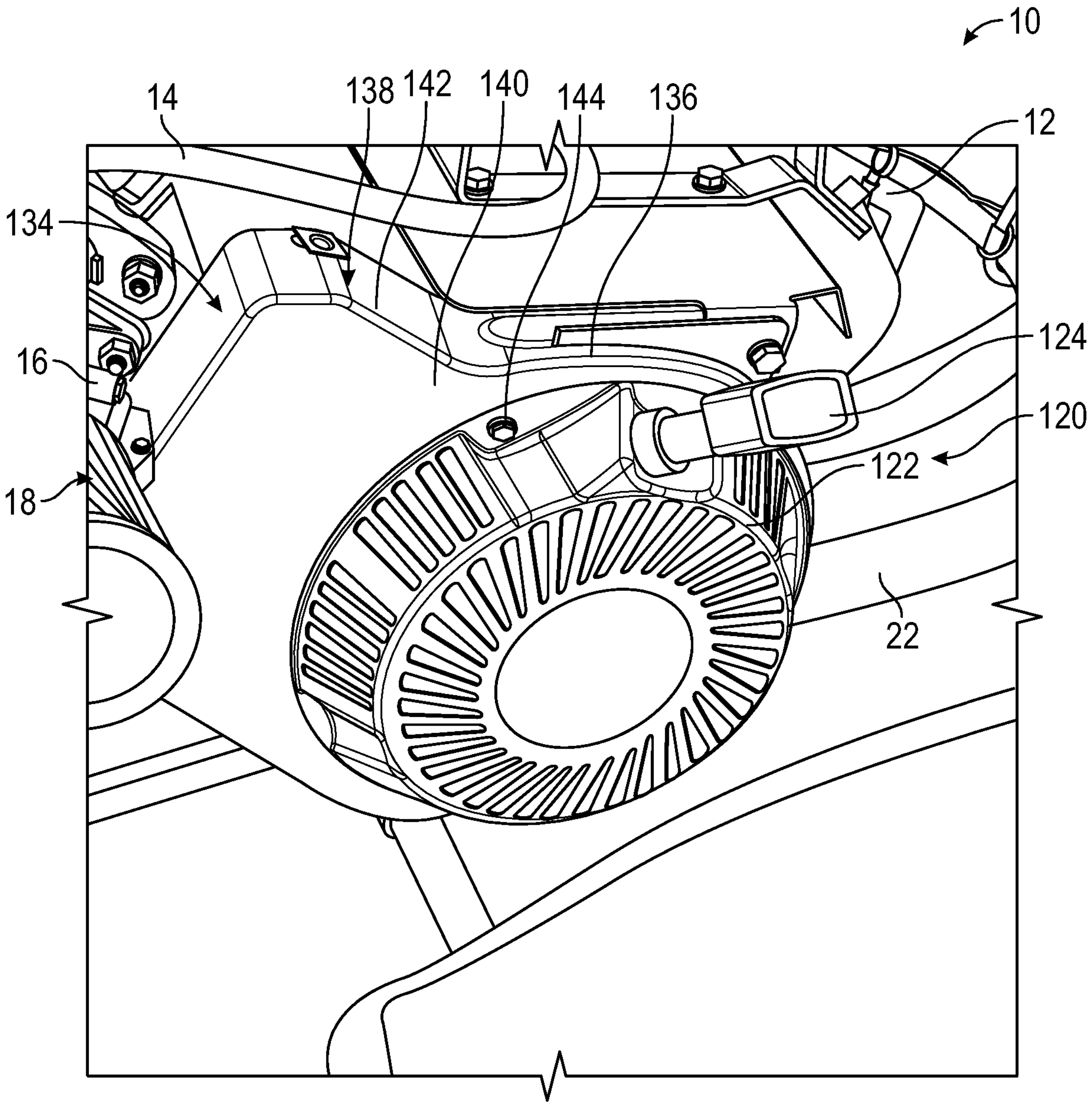
FIG. 2 is a perspective view of a portion of the kart of FIG. 1, showing an engine.

As shown in FIGS. 1-2, the engine 100 is coupled to the chassis 22 rearward of the steering assembly 28 and the operator support (e.g., user platform, user seat, bucket seat, bench, etc.), shown as seat 40 (e.g., in a rear-mounted engine configuration), according to some embodiments. In some embodiments, the engine 100 is coupled to the chassis 22 beneath the seat 40 and/or mid-way between the front and rear of the kart 10 (e.g., in a mid-mounted engine configuration). In some embodiments, the engine 100 is coupled to the chassis 22 forward of the steering assembly 28 and the seat 40 (e.g., in a front mounted engine configuration). In an exemplary embodiment, the engine 100 is operatively coupled to an axle (e.g., as an integrated drive axle, via a driveshaft, via a drive belt, via a pulley system, via a chain and sprocket system, via a transmission, via a power take off, etc.) and is configured to drive a rotation of the axle to thereby drive a rotation of a wheel 24 associated with the axle.

In some embodiments, the kart 10 is a machine that is configured to be operated in an environment in which the kart 10 must comply with at least one rule (e.g., a rule for a race, a rule regarding an engine configuration or arrangement, a rule regarding an engine emission, a rule regarding a noise output, etc.). For example, the kart 10 may be a racecar, performance vehicle, remote control airplane, remote control boat, remote control equipment, boat, train, snowmobile, transit vehicle, commercial truck, tractor, farm equipment, chainsaw, or other types of engine operated machinery that may be subject to one or more rules. In some embodiments, the kart 10 is a recreational vehicle that is used for competition between competitors to see which competitor is the best at achieving an objective (e.g., to see which competitor is fastest in covering a set course). For example, the kart 10 may be a small, relatively light-weight, and/or inexpensive vehicle and may be used for racing around a set course (e.g., a racetrack, a race course, etc.). In some embodiments, the kart 10 is an off-road only vehicle. For example, the kart 10 may be a vehicle that is not allowed to be legally operated on public roads (e.g., roads in the USA), but may be operated on privately owned roads and lands.

Engine

Referring to FIGS. 1-11, the engine 100 is shown in greater detail. In some embodiments, the engine 100 includes an engine block 102 defining a cylinder 104, a cylinder head 106, a piston 108, a crankshaft 110, and a flywheel 112. The piston 108 can reciprocates in the cylinder 104 along an axis, shown as cylinder or piston axis 105 to drive the crankshaft 110 to rotate about an axis, shown as crankshaft axis 111. In some embodiments, the engine 100 includes two or more cylinders, each having a piston 108 configured to rotate crankshaft 110. The crankshaft 110 is positioned in part within a crankcase 114. The crankshaft 110 may be oriented horizontally (i.e., a horizontal engine) with the engine 100 in its normal operating position (e.g., a standard operating position, an engine position when mounted to the chassis 22, a position when wheels 24 of kart 10 are resting on the track 26). In other embodiments, the crankshaft 110 is vertically oriented (i.e., a vertical engine) with the engine 100 in its normal operating position. The engine 100 also includes an air-fuel mixing device, shown as carburetor 16, for supplying an air-fuel mixture to the cylinder 104 (e.g., a carburetor, an electronic fuel injection system, a fuel direct injection system, etc.).

In some embodiments, the air supply system 18 has an air filter assembly 116 (e.g., a cyclonic air filter assembly, a paper filter assembly, etc.) configured to filter debris and contaminants from air entering the air supply system 18. In some embodiments the exhaust system 20 includes a muffler 118 configured to reduce or eliminate noise associated with combustion in the engine 100.

In some embodiments, the engine 100 includes a starter assembly, shown as recoil starter assembly 120. The recoil starter assembly 120 includes a cover 122 (e.g., recoil starter cover), a handle 124 connected to a rope or cable, and a spool (e.g., wheel, sheave) for the rope, where the spool is coupled to the crankshaft 110 of the engine 100. To start the engine 100, a user pulls the handle 124 to rotate the crankshaft 110 and initiate combustion processes of the engine 100. In other embodiments, the engine 100 may include an electric starting system instead of a recoil starter assembly 120. Electric starting systems may include a starter motor selectively coupled to a crankshaft and a user interface (e.g., key switch or push button) to actuate the starter motor to rotate the crankshaft, thereby starting the engine. In some embodiments, the kart 10 does not include a starter energy system (e.g., car battery, starter battery, etc.), and the electrical components of the engine 100 may only be powered while the engine 100 is rotating. In such embodiments, the engine 100 may be started by the recoil starter assembly 120. In some embodiments, a recoil starter assembly 120 may be replaced or modified by an electronic start kit that facilitates starting the engine 100 via operating an electric motor.

The engine 100 may include a power take off, shown as shaft 126, configured to transmit power from the engine 100 to one or more drive devices (e.g., driveshaft, transmission, wheels 24) and/or supplementary drive devices (e.g., fan, cam, alternator, fan, etc.). In some embodiments, the shaft 126 may be a portion of the crankshaft 110. For example, the shaft 126 may be a portion of the crankshaft 110 that protrudes from the crankcase 114. The shaft 126 may include a keyway, mounting flange, mounting groove, threading, or other features for coupling a device to the shaft 126. The shaft 126 can include one or more sprockets, pulleys, gears, or other suitable coupler features that facilitate transmitting power from the shaft 126 to a driven device. For example, the shaft 126 may include a sprocket 128. The sprocket 128 may be rotationally coupled to a belt, chain, or similar power transfer device which can transmit rotational motion and power from the shaft 126 to an output device. The output device may be a transmission of the driveline 12, a drive shaft, a differential, an electrical generator, and/or an axle coupled to one or more wheels 24. In some embodiments, the shaft 126 may be configured to transfer power (e.g., via one or more gears, belts, pulleys, chains, sprockets, etc.) to a cam, a cooling fan, an alternator, a fuel pump, an oil pump, forced induction device (e.g., supercharger), and/or other rotationally powered devices of the kart 10. In some embodiments, the sprocket 128 is removably coupled to the shaft 126 (e.g., via a set screw, key, press fit, etc.) and can facilitate replacement (e.g., substitution, retrofitting, aftermarket upgrade, OEM replacement), and/or modification (e.g., repair, enhancement, heat treatment, etc.) to the sprocket 128. In other embodiments, the sprocket 128 is integrally formed with the shaft 126 or is formed separately and joined together with the shaft 126 (e.g., via welding, heat bonding, fusing, etc.).

Figure 6:
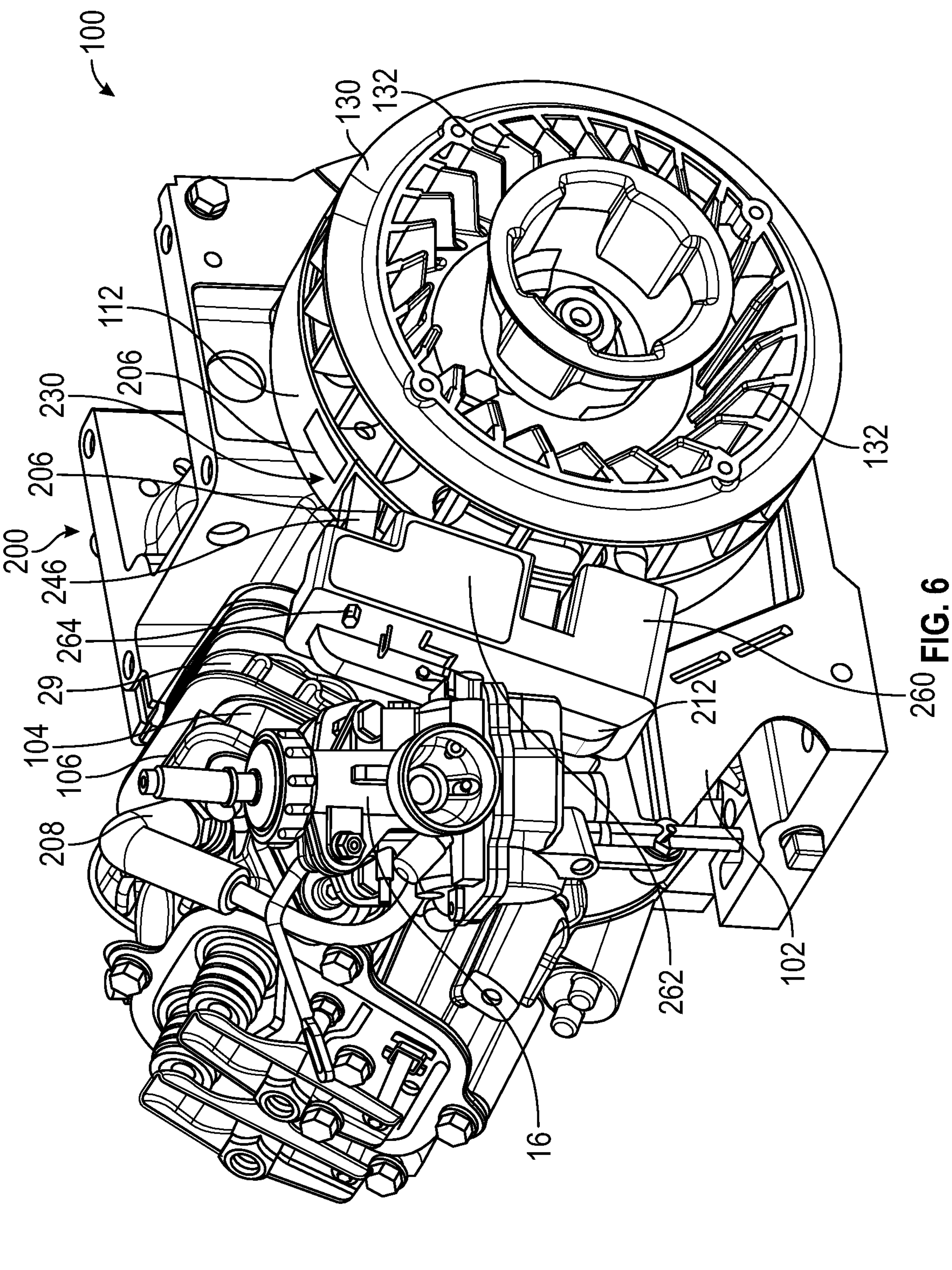
FIG. 6 is a perspective view of the engine of FIG. 2, showing an ignition system.
Figure 7:
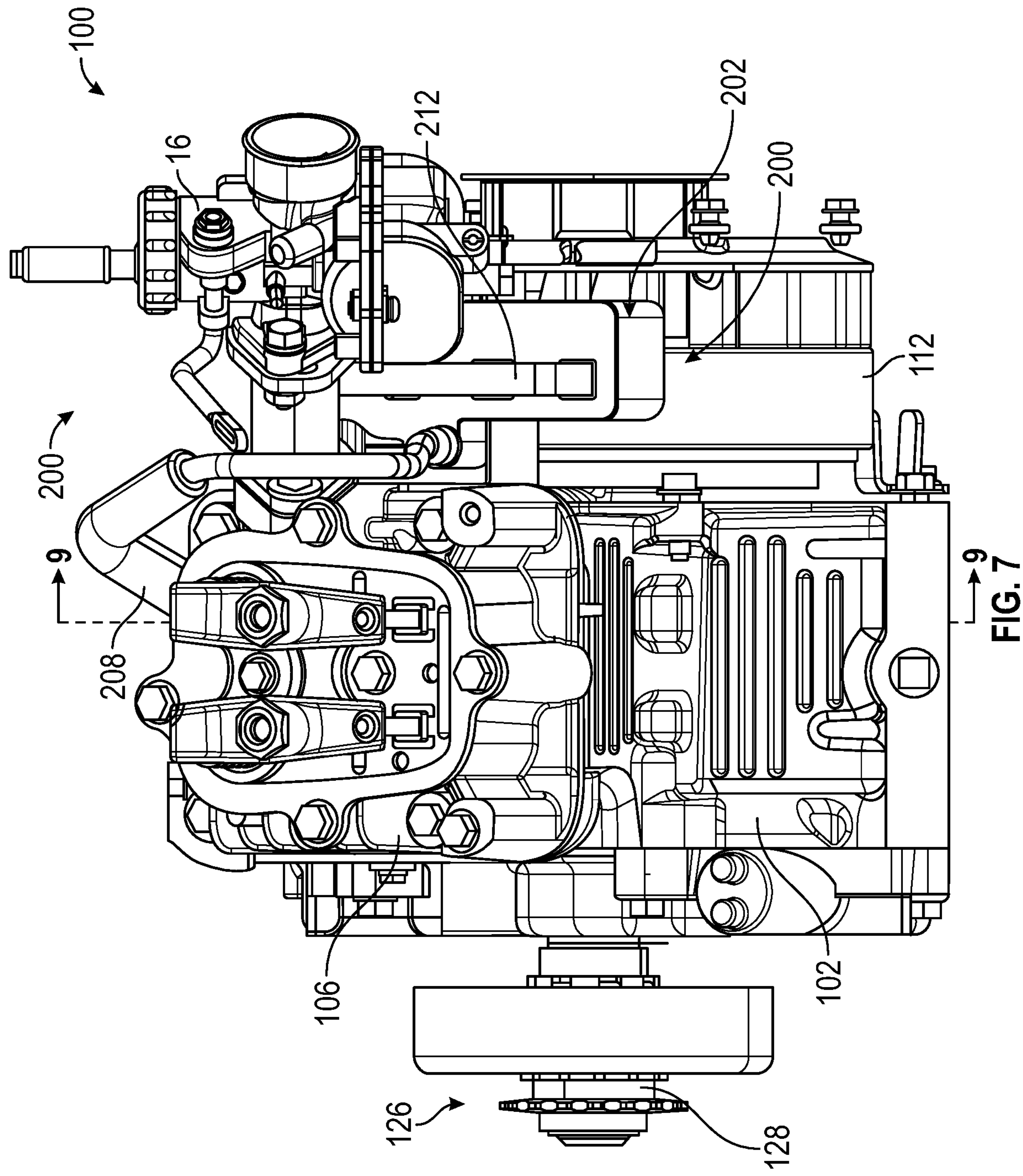
FIG. 7 is a front view of the engine of FIG. 6.
Figure 8:
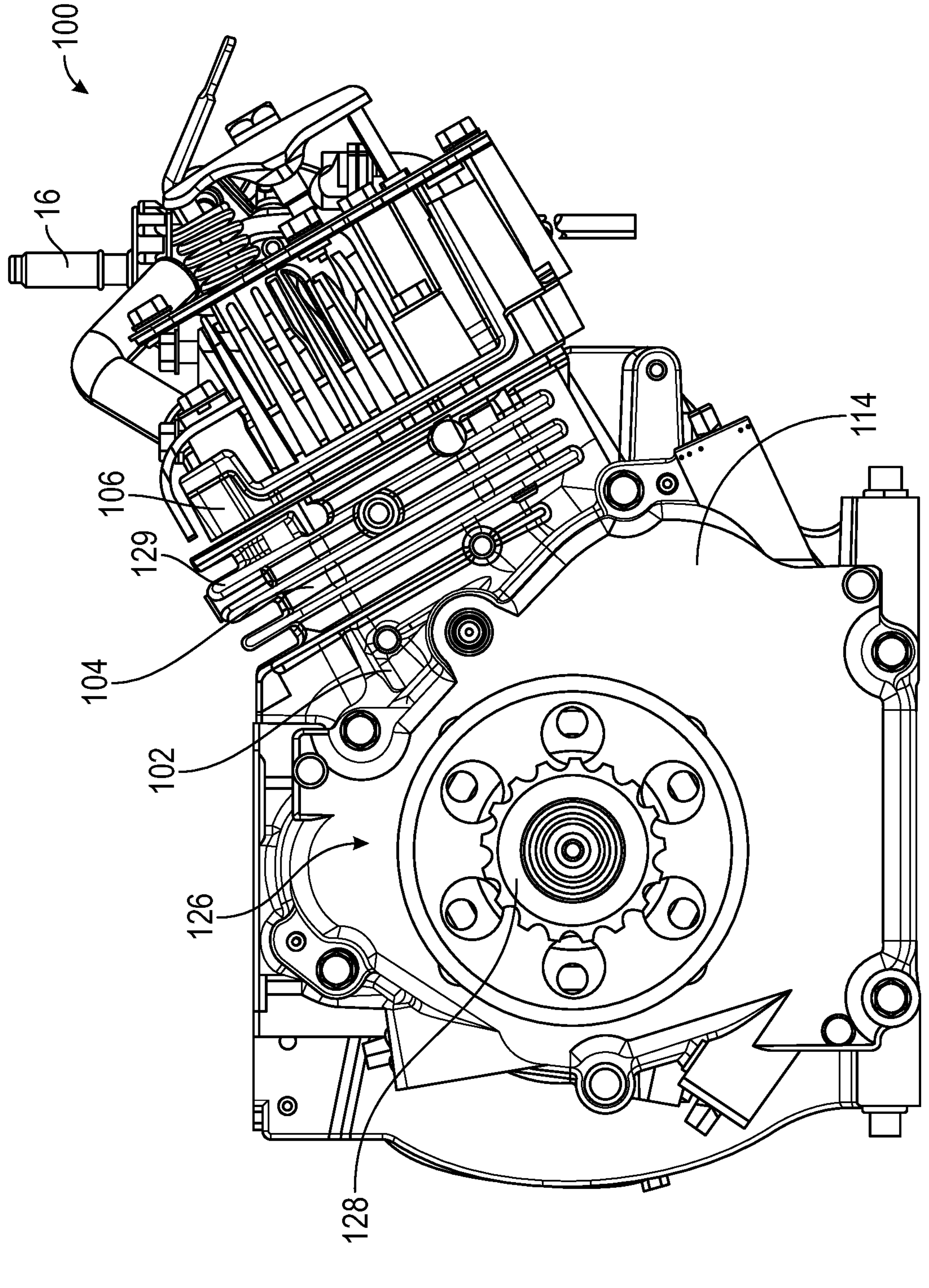
FIG. 8 is a right side view of the engine of FIG. 6 with a muffler hidden.
Figure 9:
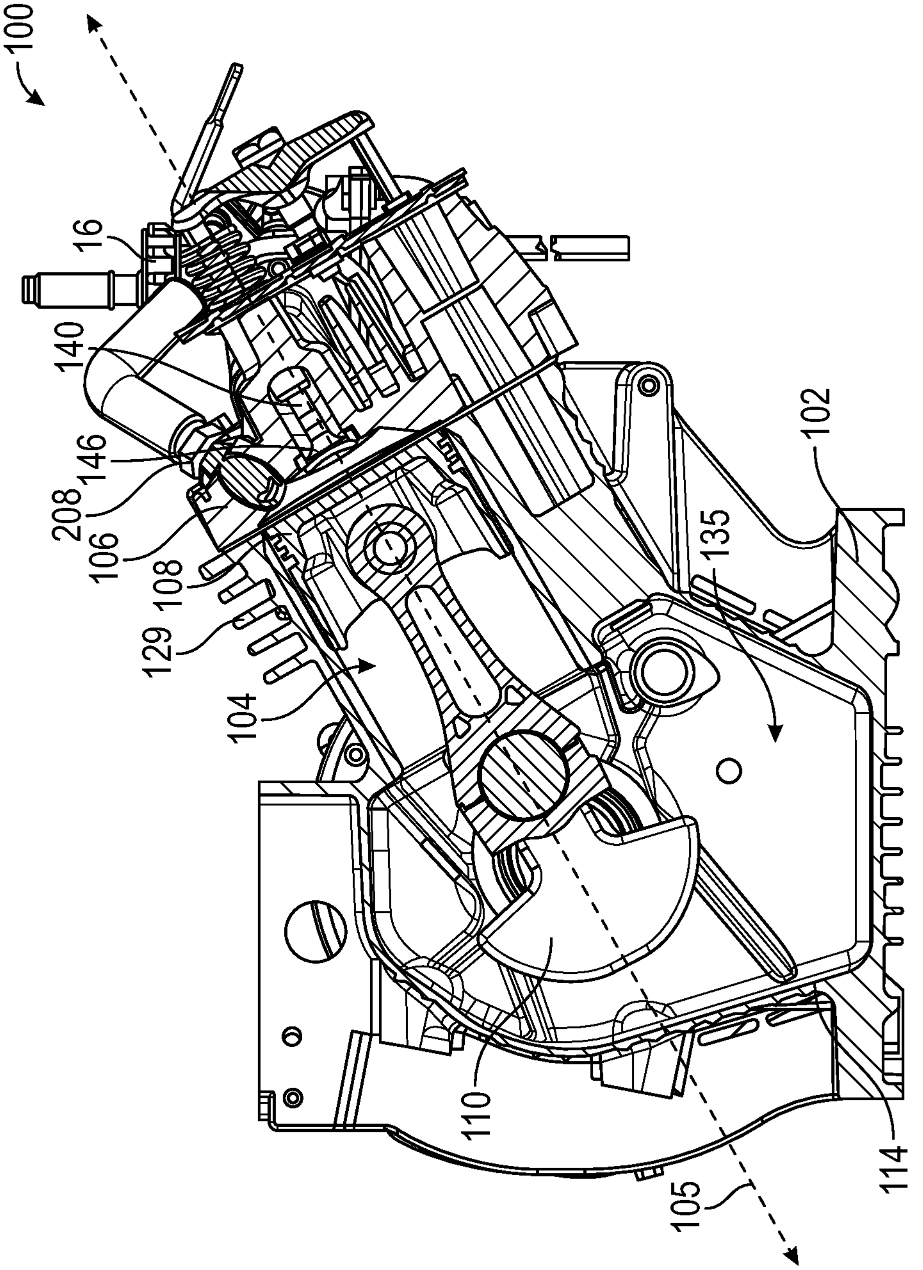
FIG. 9 is a cross sectional view of the engine of FIG. 7, taken along the line 9-9.
Figure 10:
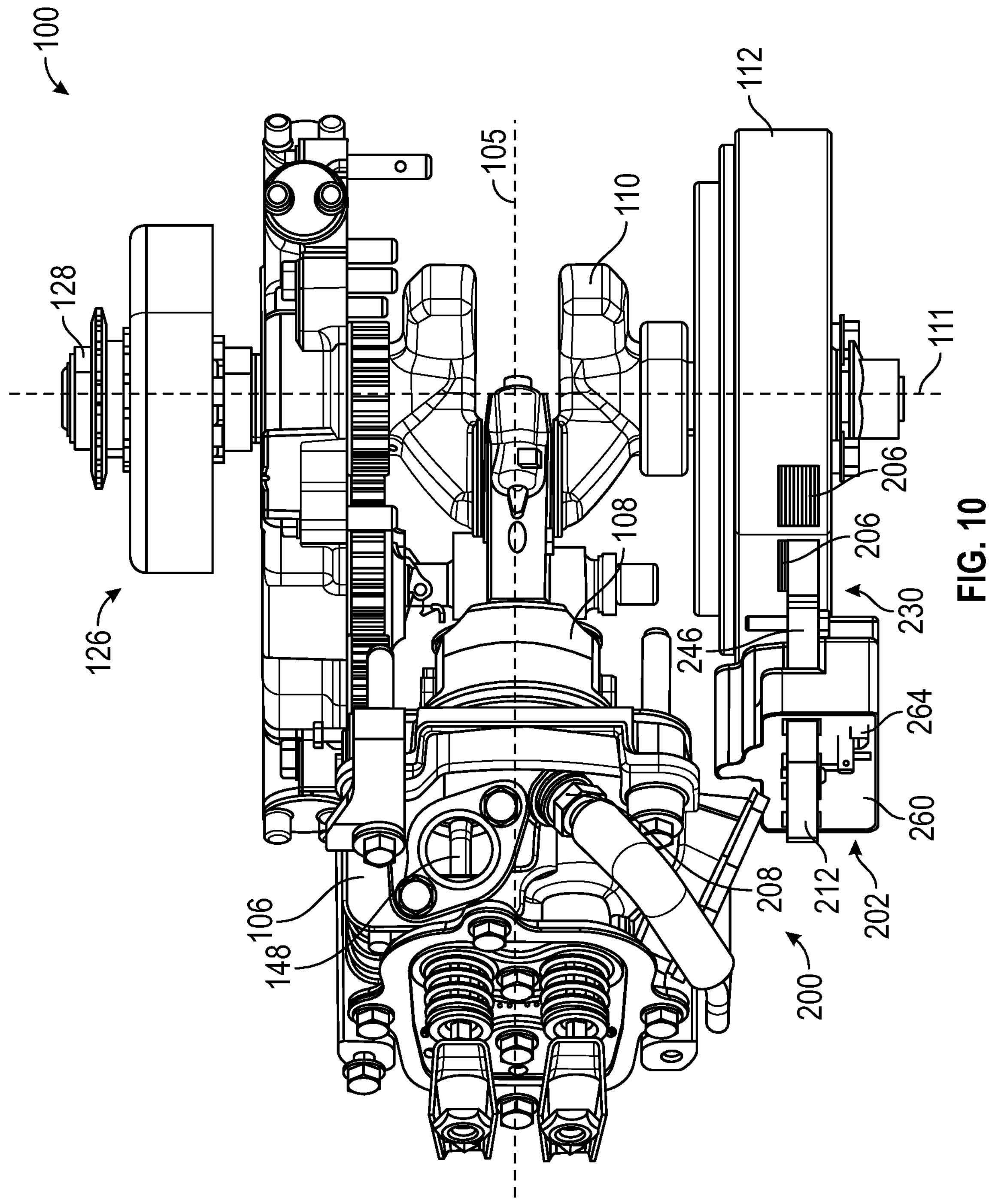
FIG. 10 is a top view of the engine of FIG. 6, showing a crankshaft.
Figure 11:
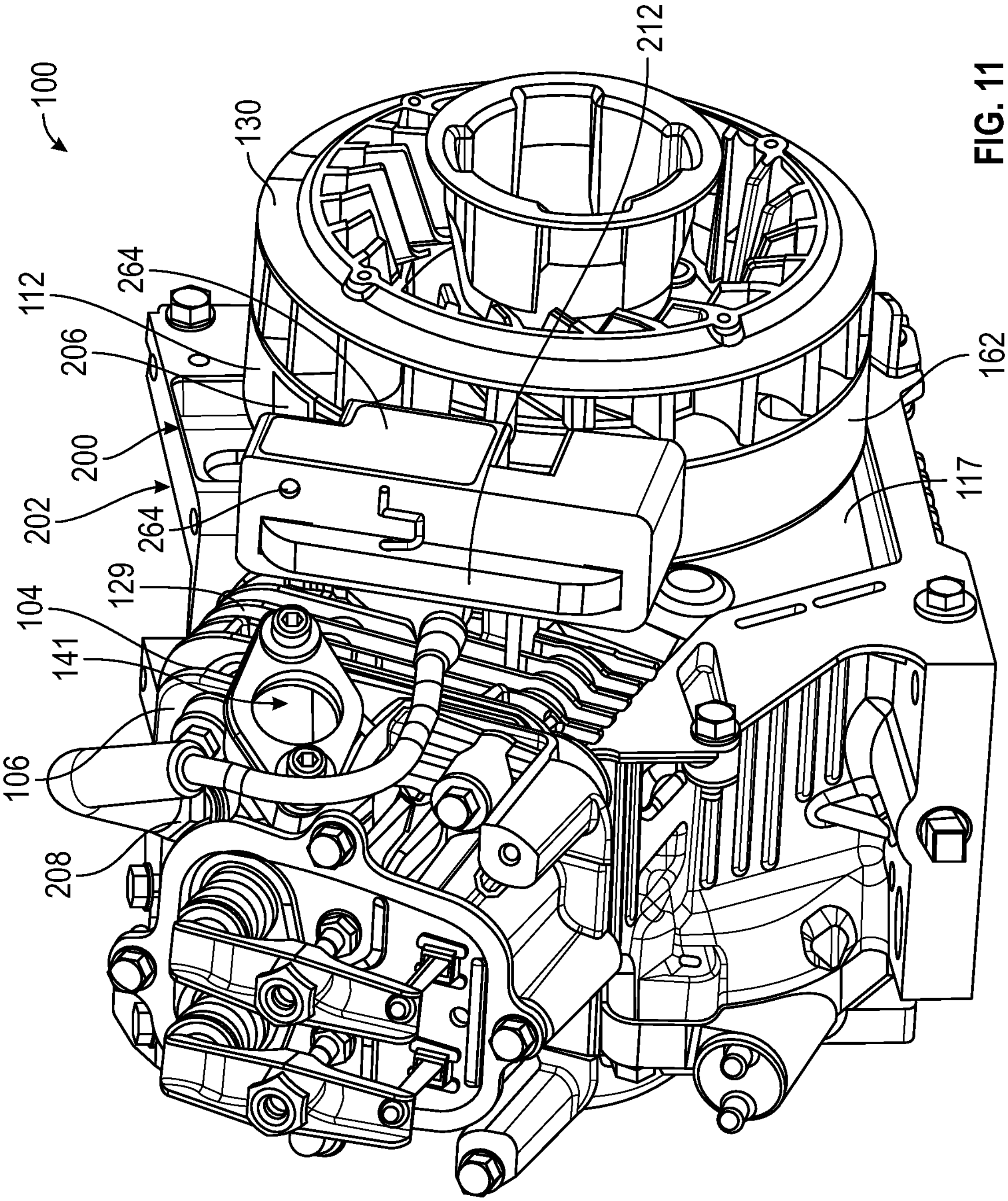
FIG. 11 is a perspective view of the engine of FIG. 6 with a carburetor hidden.
Figure 13:
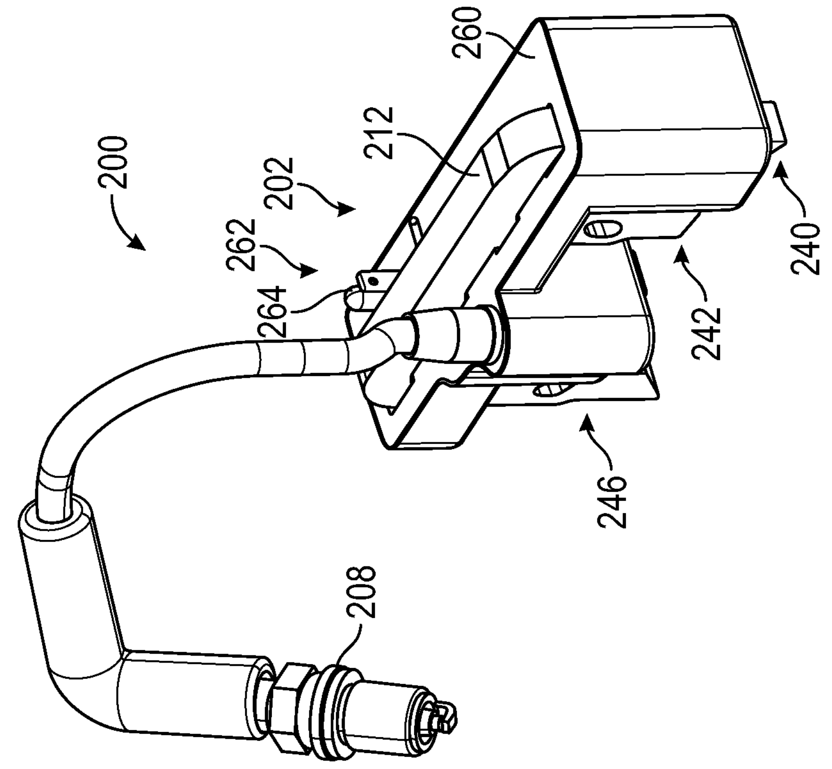
FIG. 13 is a perspective view of the ignition system of FIG. 12.
Figure 12:
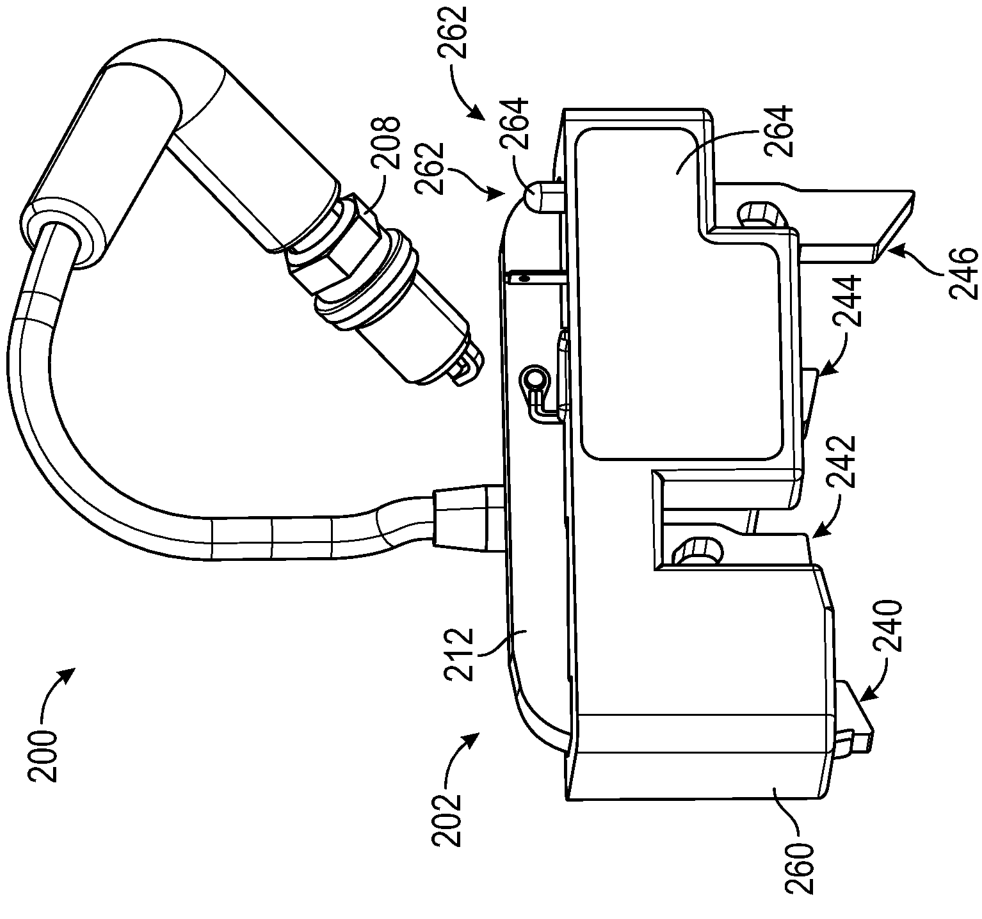
FIG. 12 is a front view of the ignition system of FIG. 6.

Referring particularly to FIGS. 6-7 and 10, the engine 100 may include a flywheel 112. The flywheel 112 may be configured to store rotational energy generated by the engine 100 and balance the speed of the engine. For example, the flywheel 112 may be formed with the crankshaft 110 (e.g., as a unified body or cast piece) or may be coupled to the crankshaft 110 (e.g., via one or more fasteners, welded, fused, etc.), and may have a relatively higher moment of inertia when compared to the crankshaft axis 111. In some embodiments, the flywheel 112 has a constant moment of inertia about the crankshaft axis 111. In other embodiments, the flywheel 112 has a variable moment of inertia (e.g., an engine speed dependent moment of inertia).

In some embodiments, the engine 100 is an air-cooled engine. For example, the engine 100 may include cooling features (e.g., ribs, fins, etc.), shown as fins 129, configured to facilitate and/or enhance cooling the engine 100 (e.g., transferring heat away from the engine 100). The fins 129 may be configured absorb and transfer heat generated during the combustion process into air ambient the engine 100 to ultimately transfer heat away from the engine 100. The engine 100 may be configured to direct a flow of air toward the fins 129 or other hot areas of the engine 100 to cool the engine 100. For example, the engine 100 may include one or more active devices (e.g., a fan, a blower, etc.) and/or passive devices (e.g., an air scoop or an air intake formed in an engine housing, a shroud, etc.) structured and positioned to force air onto the engine 100. For example, the engine 100 may include an air handling device (e.g., a fan, a blower, a fan wheel, etc.), shown as fan 130. The fan 130 may be structured and positioned to distribute air onto the engine 100. For example, the fan 130 may include one or more fins or blades 132 configured to rotate about an axis. In some embodiments, the fan 130 may be an active device operatively connected to the engine 100. For example, the fan 130 may be coupled to and configured to rotate synchronously with the crankshaft 110. In some embodiments, the fan 130 is coupled to the flywheel 112. In some embodiments, the fan 130 is powered by an electric motor and is configured to rotate independently of the crankshaft 110. The fan 130 may be coupled to the flywheel 112 and may include one or more fins or blades 132.

In some embodiments, the engine 100 is a liquid-cooled engine (e.g., a water-cooled engine). For example, the engine 100 may include one or more fluid passages (e.g., conduits, paths, cavities, etc.) which pass through the engine block 102 and/or cylinder head 106. The fluid passages may be fluidly coupled with a fluid reservoir, a heat exchanger (e.g., a heat sink, a radiator), and/or a pump configured to generate a flow of fluid in the fluid passages. The working fluid may absorb heat from the engine 100 and travel through a heat exchanger and/or a reservoir. The heat exchanger may be configured to remove heat stored in the working fluid. In some embodiments, the reservoir may function as a heat sink.

Figure 3:
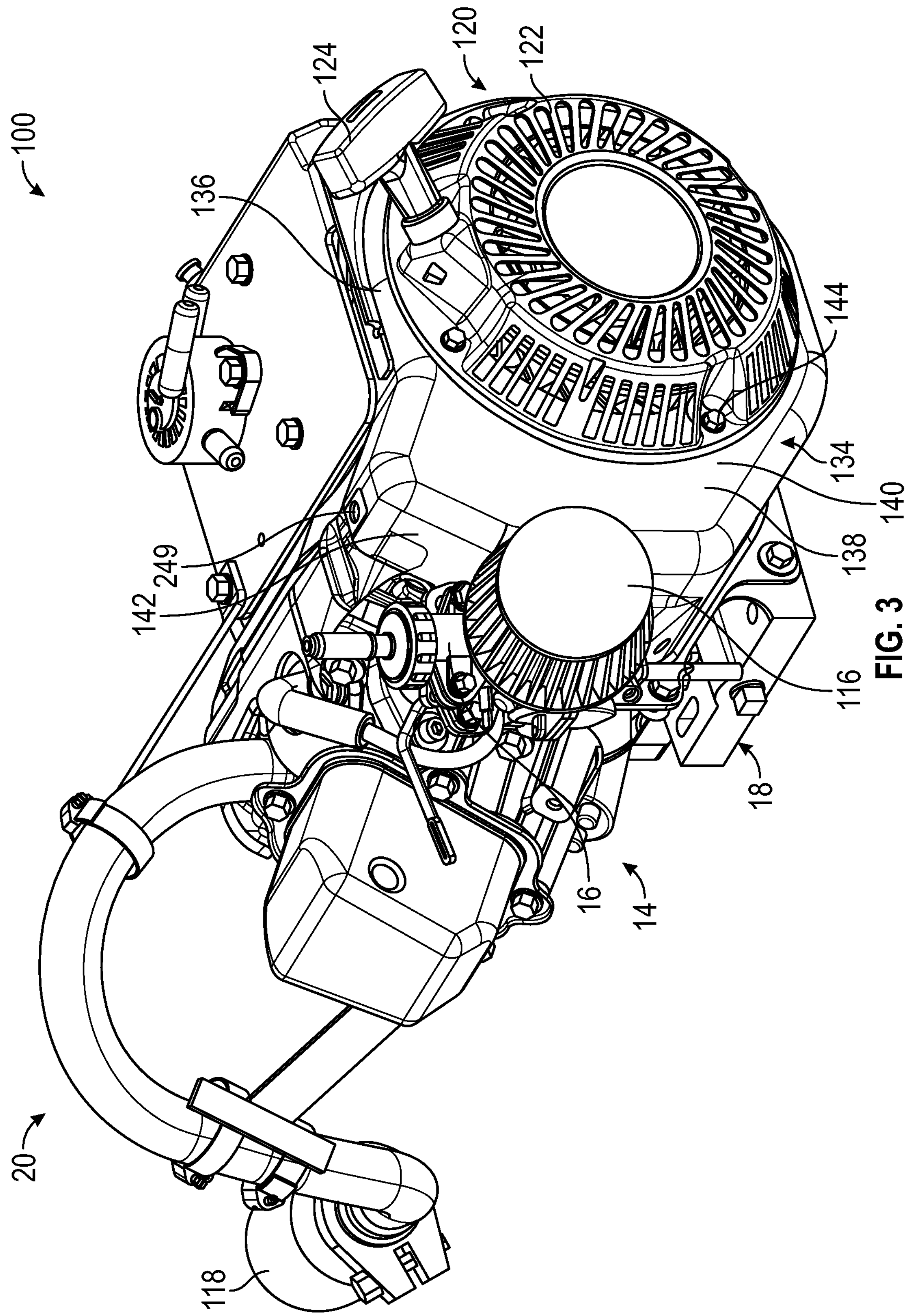
FIG. 3 is a perspective view of the engine of FIG. 2.
Figure 4:
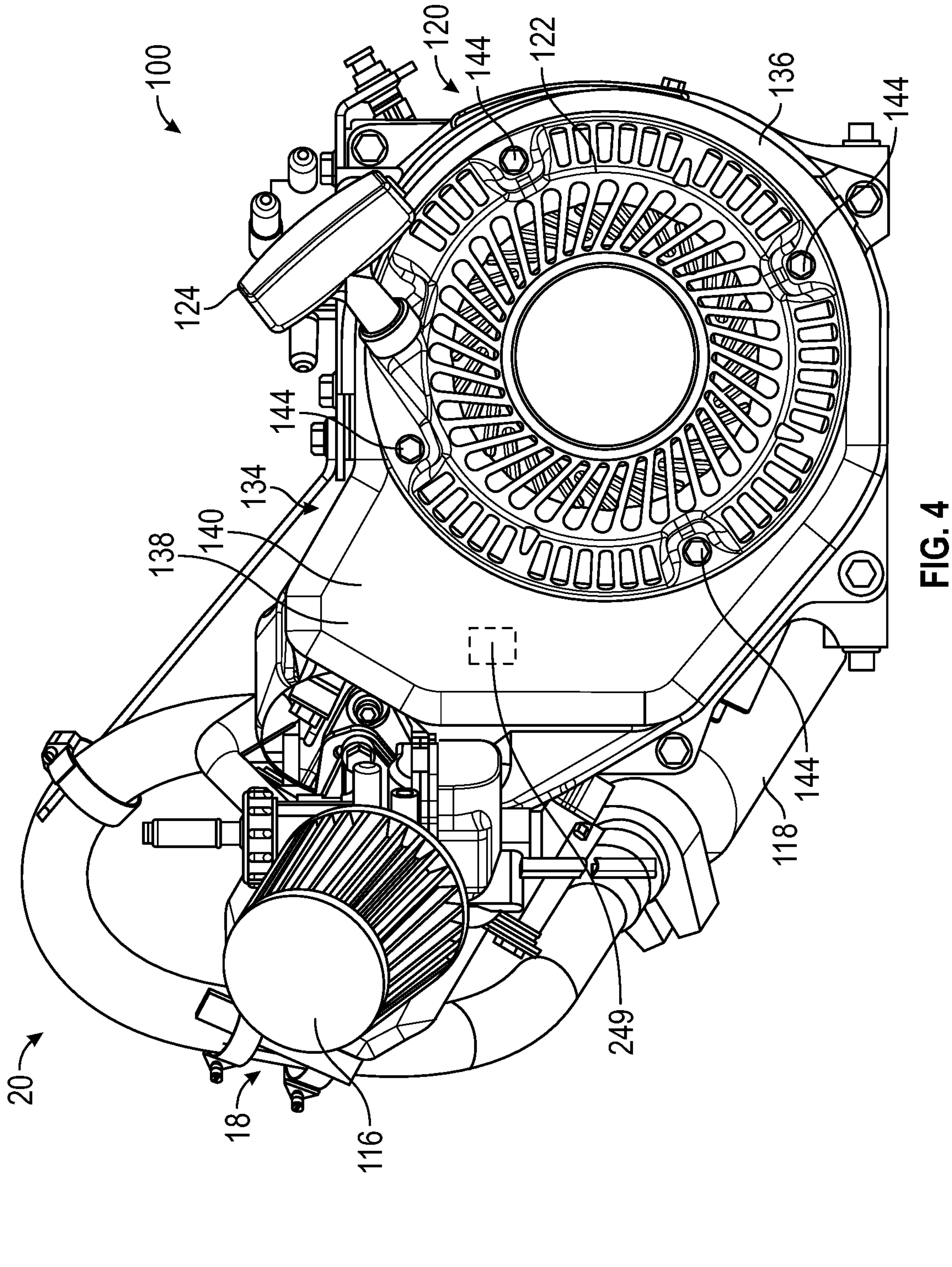
FIG. 4 is a left side view of the engine of FIG. 2.
Figure 5:
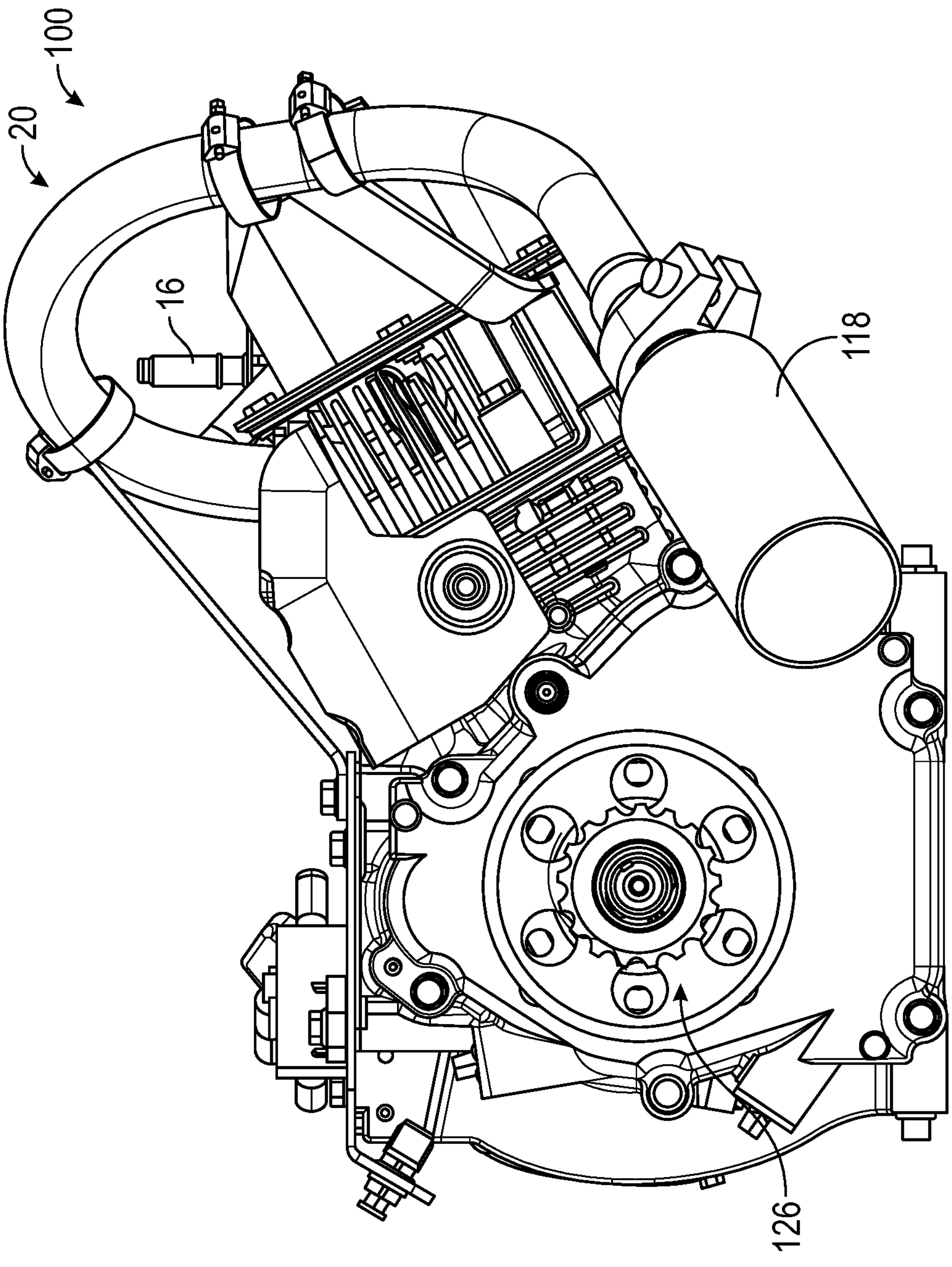
FIG. 5 is a right side view of the engine of FIG. 2.

Referring particularly to FIGS. 2-4, the engine 100 includes a housing (e.g., cover, shield, fascia, shroud, etc.), shown as blower housing 134, according to some embodiments. The blower housing 134 may be configured to shield an operator and nearby objects (e.g., wires, cables, tubing, pipes, straps, fuel tanks, etc.) from moving components of the engine (e.g., the flywheel 112, the fan 130, etc.), hot areas of the engine 100, and or electrical components of the engine 100. For example, the blower housing 134 may include a first portion 136 and a second portion 138. The first portion 136 may be sized, shaped, and positioned to at least partially enclose the flywheel 112 and a fan (e.g., fan 130). The second portion 138 of the blower housing 134 may be sized and shaped to at least partially enclose an electrical component of an ignition system (e.g., an alternator, a magento, an armature, a stator, a fan, a distributor, a condenser, a breaker, a point, a solenoid, a magnetic core, etc.). The blower housing 134 may include a top surface 140 and at least one side wall 142 extending from the top surface. The side wall 142 may extend continuously or discontinuously around a perimeter of the top surface 140. In some embodiments, the cover 122 is coupled to the blower housing 134 by, for example, one or more fasteners (e.g., snap-fit fasteners, press-fit fasteners, magnetic fasteners, screw, etc.), shown as bolts 144. In some embodiments, the cover 122 may be removed to provide access or an improved line of sight into the interior of the blower housing, which can facilitate or enhance an inspection of the components within the blower housing (e.g., the flywheel 112, a magnetic core, an ignition system, etc.). In some embodiments, the cover 122 is formed as a portion of the blower housing 134. For example, the cover 122 and the blower housing 134 may be a unified body. In some embodiments, the blower housing 134 is configured to direct a flow of air from the fan 130 toward the engine 100. As shown, the blower housing 134 may visually shield some or all of the components enclosed in the blower housing 134.

In some embodiments, the engine 100 is a two-stroke engine. For example, the engine 100 may be configured to consume a pre-mixed oil-gas mixture that functions to lubricate the cylinder 104 and the associated engine components. In other embodiments, the engine 100 is a four-stroke engine. For example, the engine 100 may include an engine lubrication system having an oil reservoir 135 configured to store and supply a lubricating fluid (e.g., oil, synthetic oil, etc.) to contact areas between components of the engine 100. For example, the oil reservoir 135 may be configured to lubricate the piston 108, connecting rod journals on the crankshaft 110, the camshaft 137, and other locations of the engine 100. In some embodiments, the oil reservoir 135 may be within an interior volume of the crankcase 114 and/or may include a supplemental and/or external oil reservoir located outside of the crankcase 114.

In some embodiments, the oil reservoir 135 is shaped and sized to store a quantity of oil specific to a target application and operating environment for the engine 100. By way of example, in racing applications where high acceleration is typically a priority (e.g., in karting, short distance racing, etc.), the engine 100 may include a relatively minimalistic oil reservoir 135 (e.g., an oil reservoir configured to store a minimally acceptable amount of oil), which may reduce the overall weight of the engine 100 and thereby enhance the acceleration of the kart 10. Similarly, other components of the engine 100 may be relatively minimalistic to enhance the performance of the engine to reduce the weight of engine 100. For example, the engine 100 may include components partially or entirely made of lightweight engineering materials (e.g., carbon fiber, titanium, aluminum, polymers, fiber-reinforced polymers, fiberglass, etc.) that facilitate a reduced weight of the kart 10. By way of another example, in competitive applications where durability or operational longevity of a kart 10 is a priority (e.g., in off-road racing, long-distance racing, etc.), the engine 100 may include a relatively oversized oil reservoir 135 which may improve oil life and thereby reduce the frequency of routine engine maintenance.

As shown in FIGS. 7-11, the air filter assembly 116 and carburetor 16 are fluidly coupled to the engine inlet port 141 and are configured to provide a composition of air-fuel mixture to the cylinder 104. The exhaust system 20 may be coupled to an exhaust port. The engine 100 may include other engine equipment, such as a camshaft 137, an inlet valve 146, an outlet valve 148, an oil pump, etc.

It is contemplated that the engine 100 can be used on a variety of end products, including recreational power sports equipment, transit vehicles, outdoor power equipment, portable jobsite equipment, and standby or portable generators. Recreational power sports equipment includes all-terrain vehicles (ATVs), motorcycles, dirt bikes, boats, jet skis, etc. Outdoor power equipment includes lawn mowers, riding tractors, snow throwers, pressure washers, tillers, log splitters, zero-turn radius mowers, walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, etc. Outdoor power equipment may, for example, use the engine 100 to drive an implement, such as a rotary blade of a lawn mower, a pump of a pressure washer, an auger of a snow thrower, and/or a drivetrain of the outdoor power equipment. Portable jobsite equipment includes portable light towers, mobile industrial heaters, and portable light stands.

Ignition System

As shown in FIGS. 10-18, an ignition system 200 is configured to provide a spark to the engine 100 to ignite a fuel air mixture within the cylinder 104. In some embodiments, the ignition system 200 is an inductive ignition system. The ignition system 200 may include an ignition device (e.g., ignition coil), shown as ignition coil device 202, situated proximate to one or more permanent magnets, shown as magnets 206. The magnets 206 may be coupled to a rotating member of the engine 100 associated with a rotation of the crankshaft 110 (e.g., flywheel 112). The ignition coil device 202 may be configured to selectively provide power (e.g., a combination of current and voltage) to at least a spark plug 208 of the ignition system 200 based on a motion of the magnets 206 proximate to the ignition coil device 202. For example, the ignition coil device 202 may selectively output a high voltage signal that controls the timing of a spark being generated by the spark plug 208 based on a rule for limiting the speed of the engine 100 below a maximum engine speed (e.g., a maximum engine speed setpoint value, etc.). The spark plug 208 may be configured to provide a spark (e.g., an electrical arc between two electrodes of the spark plug 208) within the cylinder 104 based on a high voltage signal provided to the spark plug 208. The ignition coil device 202 may include an ignition circuit, shown as ignition coil assembly 210, configured to output a high voltage signal (e.g., a signal at a voltage sufficient to cause a spark at the spark plug 208). The ignition coil assembly 210 may be supported by a magnetic core 212 and may include a winding, shown as primary coil 214 and a winding, shown as secondary coil 216. The primary coil 214 may be electrically connected (e.g., by a conductive wire, by a circuit, by an electric control device, by a processor, etc.) to an electrical flow control device, shown as trigger system 218. The trigger system 218 may be or include a trigger coil 220, which may be electrically coupled to a power control device (e.g., a transistor, rectifier, controller, etc.), shown as switching device 222. The trigger coil 220 may generate a signal for the switching device 222 to control the switching device 222 to disrupt a flow of current through the primary coil 214. The interruption of current through the primary coil 214 may subsequently generate a current at a high voltage in the secondary coil 216. In some embodiments, the current in the secondary coil 216 can provide an ignition current at a high voltage sufficient to cause the spark plug 208 to generate a spark in the engine 100. In some embodiments, a high voltage ignition timing signal can be output via the secondary coil 216 by controlling a current in the primary coil 214, according to some embodiments.

Figure 15:
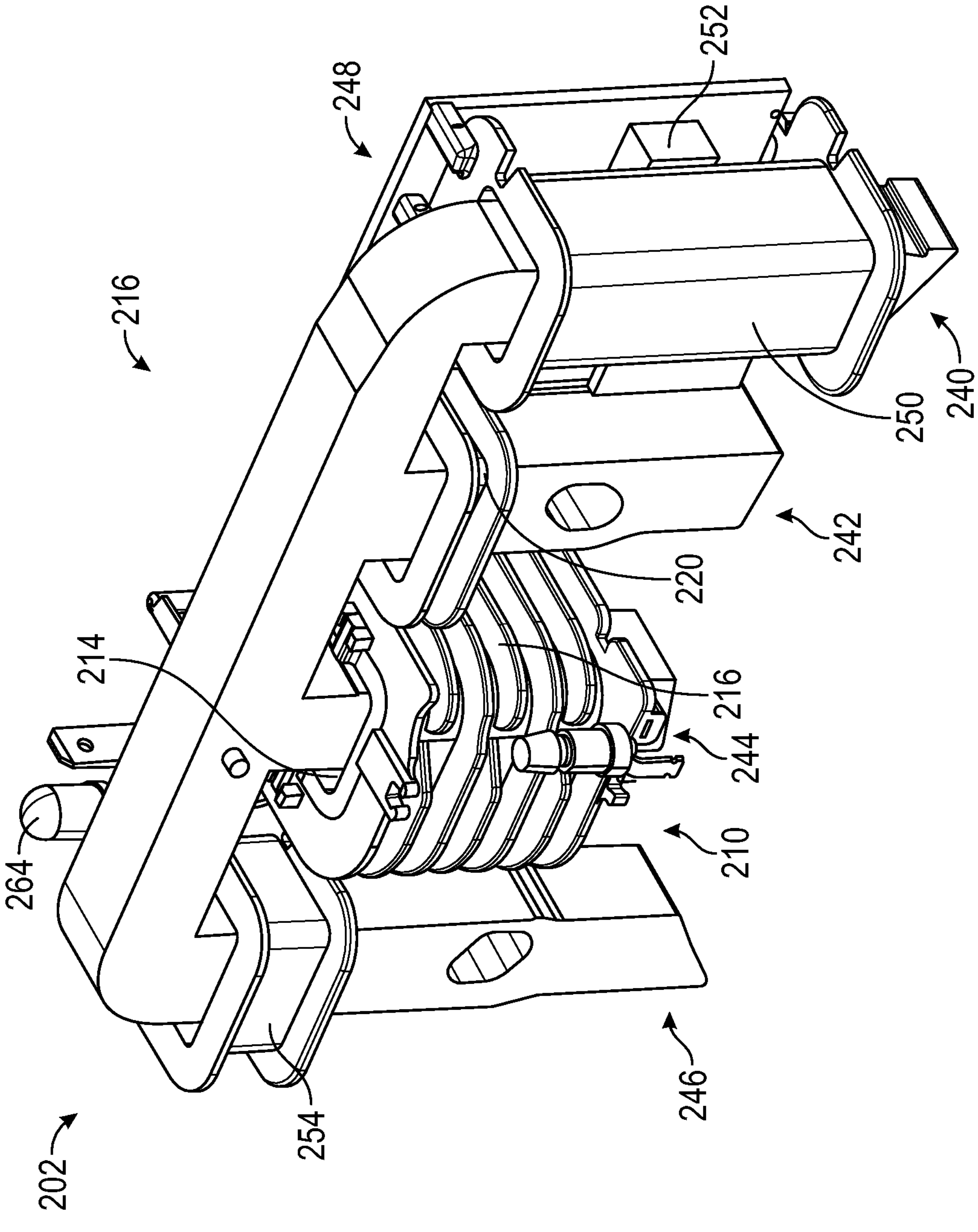
FIG. 15 is a perspective view of an ignition coil assembly of the ignition system of FIG. 12.
Figure 16:
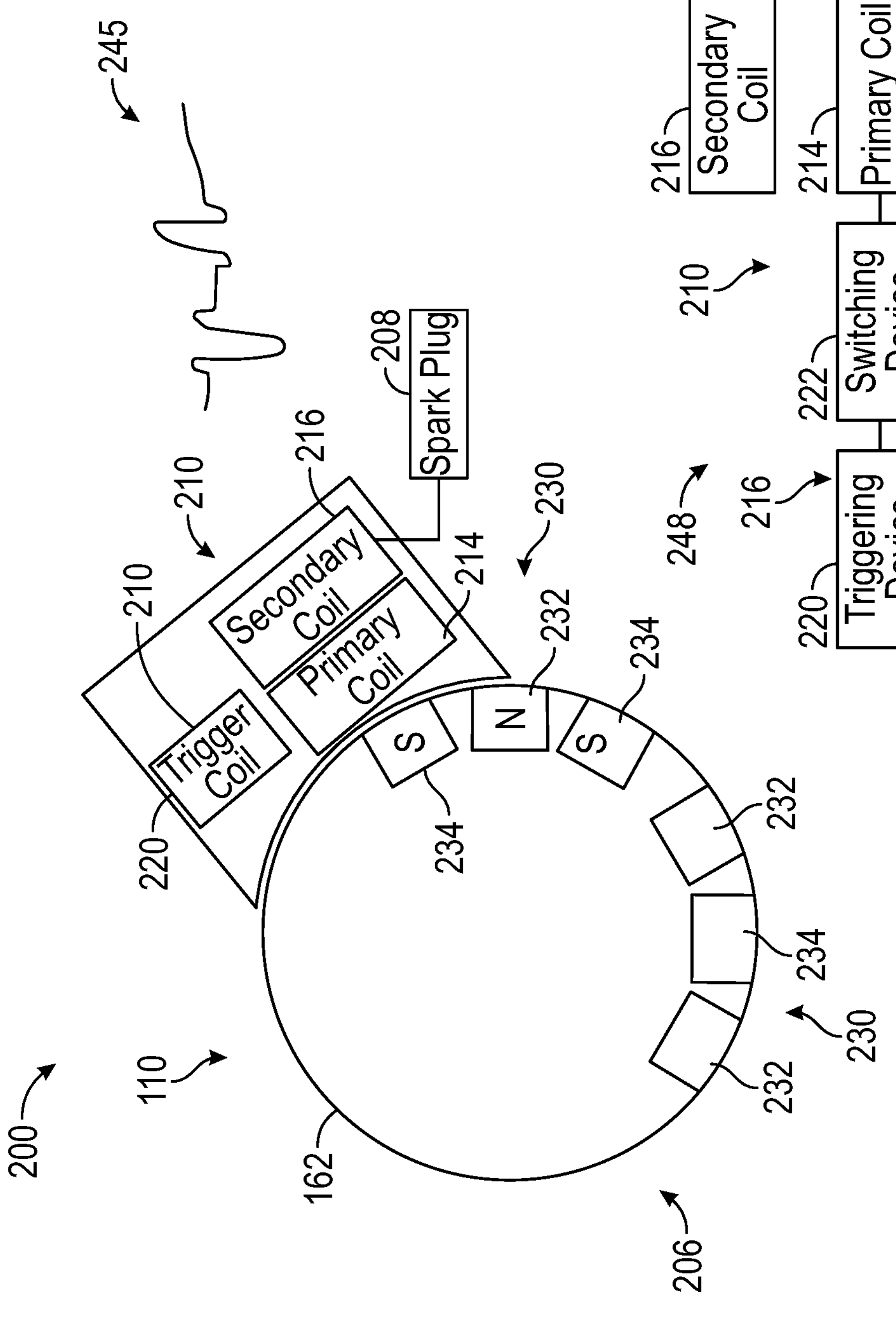
FIG. 16 is a schematic of the ignition system of FIG. 12.
Figure 17:
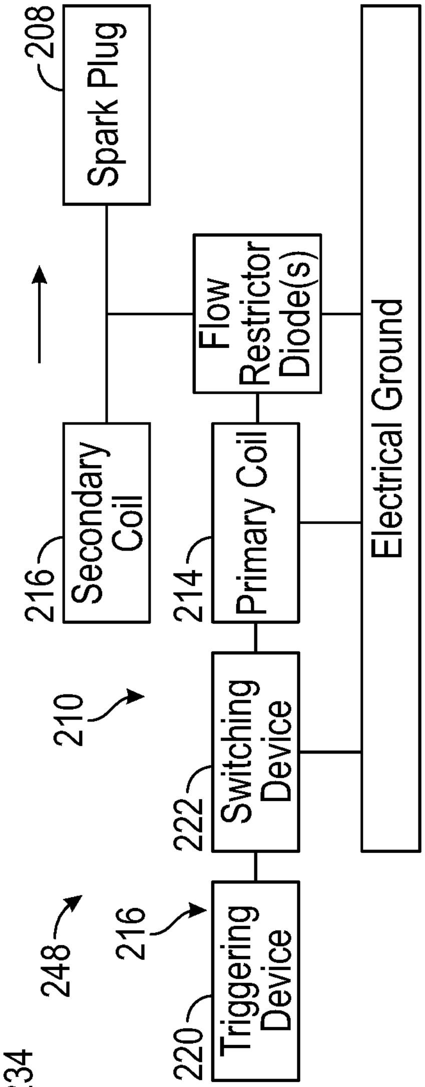
FIG. 17 is a block diagram of the ignition system of FIG. 16.

Referring particularly to FIGS. 16-17, the flywheel 112 is a circular member having a series of magnets 206 positioned along and near the outer circumference 162 of the flywheel 112. As shown in FIG. 15, the magnets 206 are positioned in magnetic cluster(s) 230. The magnetic cluster(s) 230 can be positioned 90° from each other along the outer circumference 162 of the flywheel 112. Although the magnetic cluster(s) 230 shown in FIG. 15 are spaced at a 90° interval, it is contemplated that the magnetic cluster(s) 230 could be spaced at other intervals, such as 180° or 60°.

In some embodiments, the magnetic cluster(s) 230 have different orientations. As shown in FIG. 15, the magnetic cluster(s) 230 positioned at the 3 o'clock position has a large north magnetic pole 232 positioned between two smaller south magnetic poles 234. The magnetic cluster(s) 230 positioned at the 6 o'clock position may include a large south magnetic pole 234 positioned between two smaller north magnetic poles 232. In some embodiments, the magnetic cluster(s) 230 includes a south magnetic pole 234 and a north magnetic pole 232. In some embodiments, the flywheel 112 may include one or more magnetic cluster(s) 230.

Referring particularly to FIG. 16, the ignition coil device 202 is positioned close to the outer circumference 162 of the flywheel 112 such that as the flywheel 112 rotates, the magnetic cluster(s) 230 move past the magnetic core, and the primary coil 214 induces a current in the primary coil 214. The current flowing in the primary coil 214 is induced through the secondary coil 216 in a well-known manner. The rotation of the magnetic cluster(s) 230 past the primary coil 214 may induce a current having a repeating negative peak and a positive peak. For example, in the embodiment shown in FIG. 15, the negative peaks and positive peaks are separated by 90° of rotation of the flywheel 112 due to the spacing of the magnetic cluster(s) 210. In other embodiments, the negative peak and positive peak may be coupled together in a single magnetic cluster(s) 230.

As shown in FIGS. 16-17, the primary coil 214 is positioned adjacent to the secondary coil 216 such that the current flowing through the primary coil 214 can be disturbed (e.g., interrupted, pulsed, etc.) to induce a corresponding voltage and current (i.e., power) in the secondary coil 216. A person having ordinary skill in the art will appreciate that power, voltage, and current are related, and their relationships can be described using a combination of Ohm's Law, Watts Law, and/or the Joule-Lenz Law. For example, power can be expressed as a product of voltage and current. The primary coil 214 can be selectively connected to ground (e.g., a common ground, an electrical ground) through the switching device 222. The switching device 222 shown in FIG. 16 may be or include a transistor having its base connected to the trigger coil 220.

In some embodiments, the trigger system 218 includes the trigger coil 220. As can be understood in FIGS. 15-16, when the magnetic cluster(s) 230 rotate past the trigger coil 220, the trigger coil 220 activates the switching device 222 to interrupt the flow of current through the primary coil 214. For example, the trigger coil 220 may activate the switching device 222 to open or close a circuit and thereby disrupt a flow of energy through the primary coil or activate a circuit to direct energy into the primary coil 214. The interruption in the flow of energy creates a sudden and considerable flux variation, which induces a high secondary voltage on the secondary coil 216. In this way, the trigger system 218 can control whether the switching device 222 is in an open or closed condition, according to some embodiments. In some embodiments, the ignition coil assembly 210 includes the trigger system 218. For example, the ignition coil assembly 210 may determine a timing for generating a high voltage signal based on a signal received by the trigger coil 220. In some embodiments, the induction of current between the primary coil 214 and the secondary coil 216 and an associated high voltage signal is controlled directly by the trigger system 218.

The magnetic cluster(s) 230 may generate a magnetic flux in the magnetic core 212 that induces a current in the trigger coil 220 and/or the ignition coil assembly 210 (e.g., the primary coil 214 and inductively in the secondary coil 216) illustrated by voltage trace 245. Although a trigger coil 220 is illustrated in the embodiment of FIGS. 15 and 16, the trigger system 218 can have other alternate configurations.

In some embodiments, when the trigger system 218 opens the switching device 222, the current flowing through the primary coil 214 is suddenly disrupted or changed, which induces a high secondary voltage at a current in the secondary coil 216. Since current oscillates between a negative peak and a positive peak (corresponding to the magnets of the magnetic cluster(s) 230), a first current flowing in a first direction flows through the primary coil 214 as a north pole (e.g., of the first magnetic cluster(s) 230 passes by the primary coil 214) while a second current flowing in an opposite, second direction flows through the primary coil 214 when a south pole (e.g., of the magnetic cluster(s) 230) rotates past the primary coil 214. In some embodiments, the first and second currents flow through the primary coil 214 at alternating times. The current induced in the secondary coil 216 also flows in the opposite first and second directions.

As shown in FIGS. 12-15, the ignition coil device 202 includes a magnetic core 212 having a first leg (e.g., arm, stack, etc.), shown as initiation leg 240, a second leg, shown as a trigger leg 242, a third leg, shown as an ignition coil leg 244, and a fourth leg, shown as a trigger leg 246. The ignition coil device 202 can also include a controller (e.g., a microprocessor, a system on a chip, an application-specific integrated circuit, etc.), shown as ignition controller 248. In some embodiments, the ignition controller 248 includes some or all of the functionality and components of the trigger system 218. In some embodiments, the ignition controller 248 is in communication with the ignition coil assembly 210 and is configured to selectively cause the ignition circuit to output a high voltage ignition timing signal.

In some embodiments, the initiation leg 240 may include a power capturing device, shown as initiation coil 250. The initiation coil 250 may be configured to generate electrical power for powering at least a portion of the ignition controller 248. For example, the initiation coil 250 may be configured to charge one or more energy storage devices (e.g., capacitors, capacitor array, batteries, etc.), shown as capacitor 252, associated with the ignition controller 248. The capacitor 252 may be configured to regulate and/or provide electrical power to one or more circuits of the ignition coil device 202. In some embodiments, the initiation leg 240 is the first leg passed by the magnet cluster(s) 230 during an associated rotation of the engine 100.

In some embodiments, the trigger leg 242 includes a trigger device, shown as the trigger coil 220. The trigger coil 220 may be coupled to the ignition controller 248 and may provide a signal for controlling the timing and output of the high voltage ignition timing signal. For example, the trigger coil 220 may detect an engine speed (e.g., receive or generate a signal based on one or more magnets 206 passing near the trigger coil 220) that can be utilized to establish a rule that limits the engine speed to a maximum engine speed (e.g., via the trigger system 218) through the primary coil 214. In some embodiments, the trigger leg 242 is the second leg passed by the magnet clusters 230 during an associated rotation of the engine 100.

The ignition coil leg 244 may include the ignition coil assembly 210. For example, the ignition coil leg 244 may include the primary coil 214 and the secondary coil 216. The ignition coil assembly 210 may be configured to output a high voltage signal via the secondary coil 216 that is higher than the voltage in the primary coil 214. In some embodiments, the ignition coil leg 244 is the third leg passed by the magnet clusters 230 during an associated rotation of the engine 100.

The trigger leg 246 may include a coil, shown as second trigger coil 254. The second trigger coil 254 may be coupled to the ignition controller 248 and may provide a signal to the ignition controller 248. In some embodiments, the second trigger coil 254 may include some or all of the components and functionality described with respect to the trigger coil 220. The second trigger coil 254 may be configured to generate a signal that is received by the trigger system 218 for controlling the current flowing through the primary coil 214 and thereby control the output of the high voltage timing signal. For example, the second trigger coil 254 may experience an induced current and voltage that may be used by a controller (e.g., the ignition controller 248 or an engine control unit of the engine 100) as an analog or digital signal to determine engine performance values (e.g., engine speed, engine position, etc.). In some embodiments, the ignition coil leg 244 is the fourth leg passed by the magnet clusters 230 during an associated rotation of the engine 100.

In operation, as the magnet cluster(s) 230 pass by the legs 240, 242, 244, 246, the ignition controller 248 may receive power and facilitate monitoring and controlling operational characteristics of the engine 100, according to some embodiments. For example, a user may cause the flywheel 112 to rotate (e.g., as part of starting the engine 100, as part of operating the engine 100, via a recoil starter assembly 120, via an electronic starter system, etc.) and based on the rotation and subsequent motion of the magnetic cluster(s) 230, the initiation leg 240 may generate power for the ignition controller 248, and the ignition controller 248 may control spark generation at the spark plug 208. Continuing this example, once the ignition controller 248 is powered, the ignition controller 248 may monitor and store information relating to the operation of the engine (e.g., an engine speed, a current engine speed, one or more prior engine speeds, an ignition timing, a crankshaft position, etc.). For example, the ignition controller 248 may monitor and store one or more sensor values (e.g., signals from trigger coil 220, signals from second trigger coil 254, signals from other electronic sensors or circuits), etc. and/or calculated values related to supplying a spark to the engine 100.

In some embodiments, as the magnet cluster(s) 230 passes the initiation leg 240, the energy generated within the initiation coil 250 may charge the capacitor 252. In some embodiments, the capacitor 252 stores and provides energy for operating the ignition controller 248 and for supplementing or powering the ignition coil assembly 210. In some embodiments, subsequent to the ignition controller 248 receiving an adequate power for powering the components of the ignition controller 248, the ignition controller 248 may monitor and store operational data of the engine 100. For example, the ignition controller 248 may obtain and store an engine speed, a crankshaft position, etc., and determine an actual ignition timing or a target ignition timing.

In some embodiments, the ignition controller 248 may be at least partially powered by a battery or other energy storage device that is configured to power other systems (e.g., a brake light system, a headlight system, an occupant comfort system, a fuel injection system, etc.) of the kart 10 (e.g., a starter battery, a car battery, etc.). For example, the ignition system 200 may be connected (e.g., wired) to one or more batteries. In such examples, the ignition controller 248 may be operational when the flywheel 112 is not rotating (e.g., before starting the engine 100, after turning the engine off, during storage of the engine 100). However, in certain applications, the kart 10 does not include a battery and thereby does not include the associated cost (e.g., assembly costs, maintenance costs, manufacturer costs) and weight of the battery. In some embodiments, the ignition system 200 utilizes an ignition coil device 202 that is not powered by a large battery. For example, the ignition controller 248 may receive power from one or more legs of the ignition coil device 202 (e.g., the initiation leg 240), which may store energy in a capacitor or a small battery for operating one or more components of the ignition controller 248. In some embodiments, the ignition system 200 includes an ignition system battery (e.g., battery array, lithium-ion battery, single-cell battery, integrated-circuit battery, an on-circuit-board battery, a system on a chip battery, capacitor 252, etc.) that stores and provides power for only the electronic components of the ignition system 200.

In some embodiments, as the magnetic cluster(s) 230 passes the trigger leg 246, the second trigger coil 254 experiences a current which is detected by the ignition controller 248. In some embodiments, the ignition controller 248 may utilize the signal (e.g., the voltage and/or current) generated in the second trigger coil 254 to determine an engine speed. For example, the ignition controller 248 may utilize the signal generated by the second trigger coil 254 to determine an engine speed by measuring an elapsed time between signals received from the second trigger coil 254, which can be used to determine the engine speed via a relationship between the signal and the crankshaft position. For example, a relationship may be that a rotation of the flywheel 112 is equivalent to a rotation of the crankshaft 110, and the ignition controller 248 may determine the rotational speed of the flywheel 112 based on a known number of magnets and/or their positions on the flywheel 112. By way of another example, the second trigger coil 254 may generate one or more signals having a known relationship to the angular position of the crankshaft 110, which may be utilized by the ignition controller 248 to determine a rotational speed of the crankshaft. In some embodiments, the trigger leg 246 includes a sensor utilized by the ignition coil device 202 for detecting a speed of the engine 100. In some embodiments, the determined speed of the engine 100 may be utilized by the ignition controller 248 to determine an ignition timing (e.g., spark delay, spark advance, etc.) or to determine whether to generate a spark.

In some embodiments, as the magnetic cluster(s) 230 passes the ignition coil leg 244, the primary coil 214 experiences a current, which may be supplemented by a current provided by the capacitor 252. The capacitor 252 may be controlled to selectively discharge a charge stored in the capacitor 252 to the primary coil 214 based on one or more operational characteristics of the engine 100. For example, the ignition controller 248 may be configured to control the capacitor 252 to discharge based on a determined rotational speed of the engine 100.

In some embodiments, as the magnetic cluster(s) 230 passes the second trigger coil 254, the second trigger coil 254 experiences a current. The second trigger coil 254 may function similarly to the trigger coil 220. For example, the second trigger coil 254 may generate a signal for the ignition controller 248. In some embodiments, the second trigger coil 254 is configured to control the switching device 222 for interrupting the flow of current through the primary coil 214. The second trigger coil 254 may control the switching device 222 prior to the capacitor 252 being fully charged and/or before the ignition controller 248 receives sufficient power for controlling the output of the high voltage signal (e.g., controlling the discharge of the capacitor 252). For example, the second trigger coil 254 may facilitate a spark being generated at the spark plug 208 while starting the engine 100 in circumstances where the ignition controller 248 is not fully powered. For example, the second trigger coil 254 may facilitate starting the engine 100 when the ignition controller 248 is powered by rotation of the crankshaft 110 and the ignition controller 248 does not include a power storage device, or the power storage device is empty (e.g., depleted, uncharged, etc.).

In some embodiments, the proportions and arrangement of the coils 250, 220, 214, 216, and 254 may be different than shown. The coils 250, 220, 214, 216, 254 may be or include a conductive wire (e.g., copper wire) of a same or different gauge. A person having ordinary skill in the art will appreciate that a relationship exists between the number of loops of wire around a core (e.g., magnetic core 212) and the voltage induced in the wire (e.g., Faraday's Law of Induction). The coils 250, 220, 214, 216, 254 may each include a different number of turns which correspond to various induced voltages based on a magnetic flux nearby the coil. Accordingly, various portions of the ignition controller 248 can operate at various logic levels (e.g., voltages).

In some embodiments, the ignition coil device 202 includes a housing, shown as housing 260. The housing 260 may be configured to shield the components of the ignition coil device 202 from debris, water, and/or other contaminants. In some embodiments, the housing 260 is shaped and positioned to enclose at least a portion of the initiation coil 250, trigger coil 220, ignition coil assembly 210, second trigger coil 254, and/or ignition controller 248. In some embodiments, at least a portion of the housing includes markings or an indication representing a particular configuration or setting of the ignition coil device 202. For example, a first ignition coil device 202 having a first setting or configuration may include a blue housing 260, and a second ignition coil device 202 having a second setting or configuration may include a red housing 260. In this way, for example, otherwise visually imperceptible differences (e.g., software settings) between similarly structured ignition coil devices 202 may be more easily identifiable via a visual inspection of the housing 260.

Figure 14:
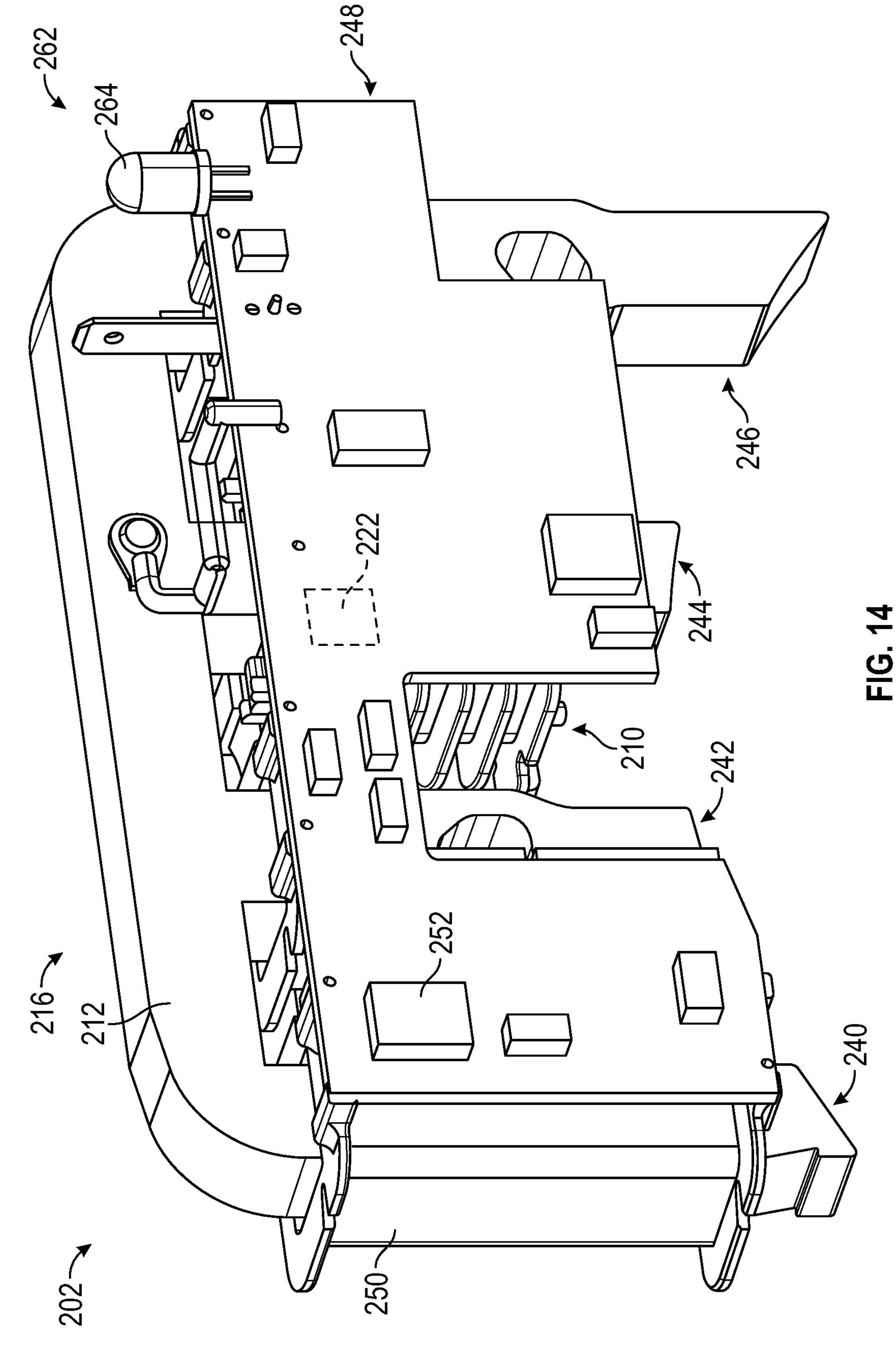
FIG. 14 is a perspective view of an ignition coil device of the ignition system of FIG. 12.

As shown in FIGS. 12-15, the ignition coil device 202 includes an information output device (e.g., an indication system, a status indicator, an operational data indicator, a user interface, etc.), shown as indicator 262. The indicator 262 may be or include one or more of a light emitting device (e.g., a light emitting diode), a display (e.g., liquid crystal display, organic light emitting diode display, electrophoretic display, etc.), a speaker, a radio frequency identification transmitter or receiver, and/or other electronically powered information output devices. As shown in FIG. 14, the indicator 262 includes a light (e.g., a light emitting device, illumination device, etc.), shown as light emitting diode (LED) 264. In some embodiments, the LED 264 is configured to emit visible light in a color that matches the color of at least a portion of the housing 260, blower housing 134, engine 100, and/or kart 10. For example, the LED 264 may illuminate and emit a blue light for ignition coil devices 202 having a blue housing, both of which indicate the same maximum engine speed intended to be produced by the ignition coil device 202 (e.g., 12,000 revolutions per minute (RPMs)). In other embodiments, the LED 264 may selectively emit any or a portion of the spectrum of light at various intensity. In some embodiments, the light output from the LED 264 corresponds to a setting or configuration of the ignition coil device 202. In some embodiments, the light output from the LED 264 is controlled by the ignition controller 248.

In some embodiments, the indicator 262 is configured to output a signal using a non-visible wavelength of light. For example, the indicator 262 may include a LED 264 configured to output an infrared (IR) light. Continuing this example, the IR emitting device may facilitate a message being emitted to an individual having an IR detecting device (e.g., IR sensor). For example, a compliance enforcer (e.g., race official) and/or other observer (e.g., operator, user, race participant, etc.), may utilize an IR detector (e.g., IR camera) to view a message presented by the indicator 262. In some embodiments, the compliance enforcer and/or other observer may use other devices (e.g., receivers, transmitters, etc.) configured to detect a signal (e.g., a radio signal, a cellular signal, etc.) emitted by the indicator 262.

In some embodiments, the indicator 262 is coupled to or defines an outer surface of the ignition coil device 202. In some embodiments, LED 264 may be coupled to the ignition controller 248. In some embodiments, at least a portion of the LED 264 may extend through an aperture in the housing 260 and defines an outer surface (e.g., a visible surface) of the ignition coil device 202. In other embodiments, the LED 264 does not define a portion of the outer surface (e.g., a non-visible surface). For example, the LED 264 may emit a signal through the housing 260. In some embodiments, the LED 264 is positioned on the ignition coil device 202 such that the LED 264 is visible when the ignition coil device 202 is installed on the engine 100.

In some embodiments, the LED 264 is positioned on the ignition coil device 202 such that one or more sight areas (e.g., apertures, light permitting portions, gaps, voids, windows, openings, etc.), shown as sight portions 265 of the blower housing 134 may permit viewing the indicator 262 without removing the blower housing 134 from the engine 100. For example, the blower housing 134 may have one or more sight areas (e.g., clear inserts, open sections, voids, doors, etc.), shown as sight features 249 that can be utilized by a user (e.g., operator, official, etc.) to observe the light emitted by the LED 264. In some embodiments, the location of the one or more sight features 249 is such that at least one of the LED 264 or light emitted by the LED 264 is viewable by a user when the engine 100 is in a normal operating position (e.g., when the kart 10 is on the ground, when the engine 100 is fixedly coupled to an engine mount or chassis, etc.). In some embodiments, the sight features 249 may facilitate a user viewing all or a portion of the ignition coil device 202.

In some embodiments, a user may quickly identify a status of at least a portion of the engine equipment (e.g., the ignition coil device 202) by observing the LED 264. In some embodiments, at least a portion of the ignition coil device 202 is not enclosed by the blower housing 134. In some embodiments, at least a portion of the indicator 262 is not enclosed by the blower housing 134. For example, the indicator 262 may include one or more LED 264, display, and/or other data output device coupled to an outer surface (e.g., an outward facing surface, a visible surface, etc.) of the blower housing 134 and/or other surfaces of the kart 10. In such example, the indicator 262 (e.g., LED 264) may be electrically powered and operated by the ignition coil device 202 via a connection using one or more wires.

Figure 18:
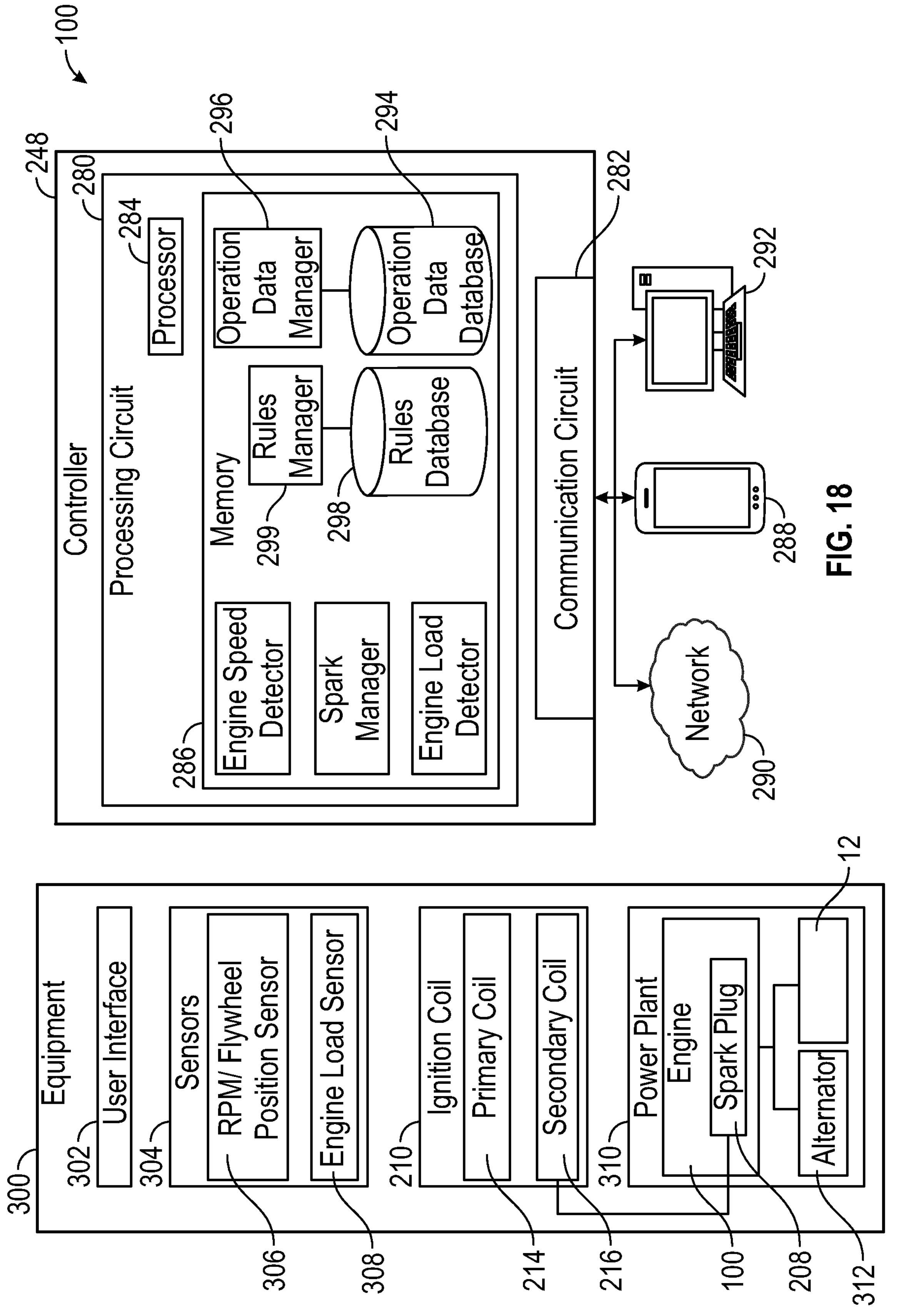
FIG. 18 is a block diagram of a controller of the ignition system of FIG. 12.

As shown in FIG. 18, the ignition controller 248 is configured to monitor and control the ignition system 200 and/or some or all of the electronic systems (e.g., a fuel injection system, a throttle by wire system, an electric fan, a cooling system, a lighting system, load sensors, exhaust sensors, etc.) of the kart 10. For example, the ignition controller 248 may monitor and control the timing, duration, or availability of a spark for the ignition system 200 with respect to one or more operational set points and other engine operation values (e.g., a detected engine speed, an engine load, etc.).

In some embodiments, the ignition controller 248 may include a processing circuit 280. The processing circuit 280 can be communicably coupled to communications interface 282 such that the processing circuit 280 and the various components thereof can send and receive data via communications interface 282. The processing circuit 280 can include one or more processors 284 communicably coupled to one or more memory storage devices, shown as memory 286. The processor 284 can be implemented as a general purpose processor, an application specific integrated circuit (ASIC), one or more field programmable gate arrays (FPGAs), a group of processing components, or other suitable electronic processing components.

In some embodiments, the memory 286 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 286 can be or include volatile memory or non-volatile memory. The memory 286 can include database components, object code components, script components, or any other type of information structure for supporting the various activities and information structures described in the present application. According to an example embodiment, the memory 286 is communicably connected to processor 284 via processing circuit 280 and includes computer code for executing (e.g., by the processing circuit 280 and/or the processor 284) one or more processes described herein. As illustrated, the memory 286 is implemented within a single computer (e.g., one housing, etc.). In various other embodiments, the memory 286 and/or the ignition controller 248 can be distributed across multiple servers or computers (e.g., that can exist in distributed locations).

In some embodiments, the communications interface 282 facilitates communications between ignition controller 248 and an external device or system. An external device or system may be or include a user device 288 (e.g., computer, smart watch, computer, smartphone, portable computing device, etc.), a network 290 (e.g., cellular network, wireless networks, LAN, WAN, etc.), and/or an external data administration system 292 (e.g., an administrative computing system, an engine manufacturer's computer system, a cloud computing resource, etc.). As such, communications interface 282 can be or include wired and/or wireless communications interface (e.g., jacks, antennas, transmitters, receivers, transceivers, wire terminals, short range wireless transceivers, etc.) for conducting data communications between the ignition controller 248 and the external devices and systems. In various embodiments, communications via communications interface 282 can be direct (e.g., local wired or wireless communications) or via the network 290 (e.g., a WAN, the Internet, a cellular network, a CAN, etc.).

In some embodiments, memory 286 includes an operation data database 294 and an operation data manager 296. The operation data database 294 may be configured to store data relating to the operation of the engine 100, for example, settings, sensor values, setpoint values, historical sensor values, user settings, engine manufacturer specifications, engine manufacturer information, product identification information, product configuration information, serial numbers, and other information and data, according to some embodiments. The operation data manager 296 may be configured to manage operation data stored in the operation data database 294. For example, the operation data manager 296 may be configured to selectively modify, add, delete, retrieve, etc., data stored in the operation data database. For example, the operation data manager 296 may retrieve one or more sensor values by querying the operation data database 294 using a data attribute (e.g., a time, a sensor ID, a value, a range, etc.) of the operation data as a query key. In some embodiments, the operation data manager 296 may support one or more application programming interfaces (APIs) and/or computer programming languages. The rules database 298 may include rules for operating the processing circuit 280 (e.g., firmware), rules for operating ignition system 200 (e.g., software), rules for storing and collecting data of the engine 100, and still other rules and data which support at least one function of the ignition system 200.

In some embodiments, the rules database 298 includes one or more rules for indicating a state of the ignition system 200 and/or engine 100 based on data stored in the operation data database 294. For example, the rules database 298 may include a rule for operating a user interface 302, which may include the indicator 262 based on one or more values of data stored in the operation data database 294. For example, the user interface 302 may be configured to generate at least one of an auditory signal, visual signal, tactile signal, electromagnetic signal, etc., that indicates the configuration of the engine and/or ignition system 200. In some embodiments, the ignition system 200 is configured to cause the indicator 262 to emit a message (e.g., via pulses, flashes, colors, patterns, etc.) representing a value stored in the memory 286 attributed to an engine RPM limit, an engine load limit, a detected engine speed, an ignition timing (e.g., spark advance), a position of the crankshaft, and/or other data that may impact the behavior of the ignition system 200 and/or engine 100 and ignition system 200. In this way, the configuration of the engine 100 and/or ignition system 200 may be easily identifiable by a compliance enforcement entity (e.g., a referee, a governmental agency, a non-governmental agency, an emissions regulatory authority, a race official, etc.) which may facilitate an efficient and accurate engine compliance analysis and inspection process. In some embodiments, the configuration of the engine 100 and/or ignition system 200 may be presented (e.g., displayed, shown, depicted, represented, etc.) on the user interface 302 and/or other systems communicably connected to the communications interface 282 (e.g., the user device 288, external data administration system 292, etc.) Advantageously, the ignition system 200 facilitates identifying one or more aspects of the configuration of the engine 100 and/or ignition system 200, which may facilitate an improved compliance verification process (e.g., a more efficient pre-race inspection process).

In some embodiments, the rules database 298 includes one or more rules for selectively providing or preventing a spark for the engine 100. For example, the rules stored in the rules database 298 may include a rule that if a determined engine speed (e.g., RPM of flywheel 112), is greater than a predetermined value (e.g., an RPM limit, RPM threshold, a maximum engine speed, a maximum engine speed configured to be provided by the ignition coil device 202, etc.) an output of the high voltage ignition timing signal configured to cause a spark in the engine 100 should be prevented. The rules manager 299 may apply the rule from the rules database 298 and generate command signals such that a spark is prevented from being generated in the engine 100 for one or more rotations of the flywheel 112 (e.g., by preventing the discharge of capacitor 252, by operating a switching device to interrupt the circuit including the spark plug 208 and the secondary coil 216, by preventing the switching device 222 from interrupting the current in the primary coil 214, etc.). In this way, the ignition controller 248 may limit the rotational speed of the engine 100 below a maximum engine speed to be provided by the ignition coil device 202. In some embodiments, the ignition controller 248 is configured to cause the ignition system 200 to skip sparks (e.g., prevent one or more future sparks, prevent the ignition coil circuit from outputting a high voltage ignition timing signal), to slow the speed of the engine 100 and/or to stop the engine 100 from operating (e.g., turn off the engine 100). In some embodiments, the ignition controller 248 is configured to turn off the engine 100 by preventing all future sparks. For example, the ignition controller 248 may establish a rule that selectively causes the ignition coil assembly 210 to prevent outputting a high voltage signal until a detected rotational speed of the engine 100 is zero).

Referring particularly to FIG. 18, the rules stored in the rules database 298 may include a rule that dictates a spark advance timing (e.g., a spark advance setpoint relative to the top dead center position of the piston 108 within the cylinder 104, a spark delay setpoint relative to the top dead center position of the piston 108 within the cylinder 104, etc.), based on a detected engine speed (e.g., RPM of flywheel 112), and/or piston 108 position. Ignition timing (e.g., spark advance, spark delay) can have various impacts on the combustion process within the engine 100 and the performance of the engine 100. For example, ignition timing can affect engine power (e.g., power output), engine efficiency (e.g., fuel economy), and engine life. Improper ignition timing may cause knocking, incomplete combustion, and other engine behaviors that are known to impact the engine power, engine efficiency, and engine life. In some embodiments, the ignition controller 248 is configured to operate the spark plug 208 such that the proper ignition timing (e.g., spark advance, spark delay, etc.) is provided to the engine 100. For example, the ignition controller 248 may periodically determine (e.g., once every second, once every microsecond) an ignition timing based on the measured values of the engine 100 according to the rules stored in the rules database 298. In some embodiments, the spark ignition timing (e.g., a spark ignition timing setpoint) is sent to the operation data manager 296 to operate the ignition coil assembly 210 accordingly. In some embodiments, the rules manager 299 determines the ignition timing as a before top dead center (BTDC) angle or after top dead center (ATDC) angle. In some embodiments, the engine position (e.g., flywheel position) is measured in crankshaft angle relative to top dead center (TDC). In such embodiments, the ignition timing setpoint may be an angle such as 3 degrees BTDC.

In some embodiments, as the speed of the engine 100 increases, the ignition controller 248 advances the ignition timing (e.g., increases the ignition angle BTDC) to accommodate the timing related to the velocity of the flame front of the associated combustion process. In some embodiments, as the speed of the engine 100 decreases, the ignition controller 248 adjusts the ignition timing to accommodate the timing related to the velocity of the flame front of the associated combustion process.

Still referring to FIG. 18, the ignition controller 248 may be communicably connected to equipment 300. The engine equipment may include one or more components of the engine 100 described above. The equipment 300 may include one or more sensors (e.g., pressure sensors, temperature sensors, position sensors, load sensors, angular position sensors, cameras, IR sensors, etc.), shown as engine sensors 304, configured to detect one or more operational characteristics of the engine 100 during operation of the engine 100. For example, the engine sensors 304 may include a speed sense circuit (e.g., engine speed detection circuit, speed circuit, etc.), shown as flywheel sensor 306, configured to determine a rotational speed of the engine 100. The flywheel sensor 306 may monitor and store a position of the flywheel 112 to determine an estimated rotational speed of the engine 100 (e.g., by determining a rotational speed of the crankshaft 110) and a position of the engine (e.g., the position of the piston 108 within the cylinder 104) based on the monitored and stored position of the crankshaft 110. By way example, the flywheel sensor 306 may detect the rotational speed of the flywheel 112 based on a signal provided by the ignition coil device 202 (e.g., a signal associated with the trigger leg 242, a signal associated with the trigger leg 246). In some embodiments, the flywheel sensor 306 is spaced from the ignition coil device 202 and may utilize one or more speed sensors (e.g., Hall Effect sensors, magnetoresistive sensors, inductive sensors, variable reluctance sensors, etc.) that may determine a position and/or rotational speed of the flywheel 112 and/or the crankshaft 110. In such embodiments, the flywheel sensor 306 may output the determined position and/or rotational speed of the flywheel 112 to the ignition controller 248 to cause the ignition coil assembly to output the high voltage ignition timing signal based on one or more rules that limit the speed of the engine (e.g., the engine RPM) to a maximum engine speed.

In some embodiments, the engine sensors 304 may include a sensor, shown as engine load sensor 308, configured to determine a load on the engine 100. For example, the engine load sensor 308 may be or include flow rate sensors (e.g., fuel flow sensors, air intake flow sensors, mass flow sensors, etc.) that determine one or more characteristics (e.g., volumetric flow rate, air fuel mixture, air temperature, fuel temperature, mass flow rate, etc.), of the air supply system 18 and/or fuel system 14 of the engine 100. The determined one or more characteristics of the engine 100 may be used to estimate an engine load (e.g., output torque demand) of the engine 100.

In some embodiments, the equipment 300 includes the ignition system 200 and a power plant 310. The power plant 310 may include the engine 100. The engine 100 may output power (e.g., mechanical power, rotational power, etc.) to an electricity generating device, shown as alternator 312, and/or the driveline 12. In some embodiments, the engine 100 may output mechanical power to the alternator 312, and electrical power generated by the alternator 312 may be provided to an actuator of the driveline 12 (e.g., an electric motor, a wheel motor, a hub motor, etc.) to power one or more output devices of the kart 10 (e.g., wheels 24).

Figure 19:
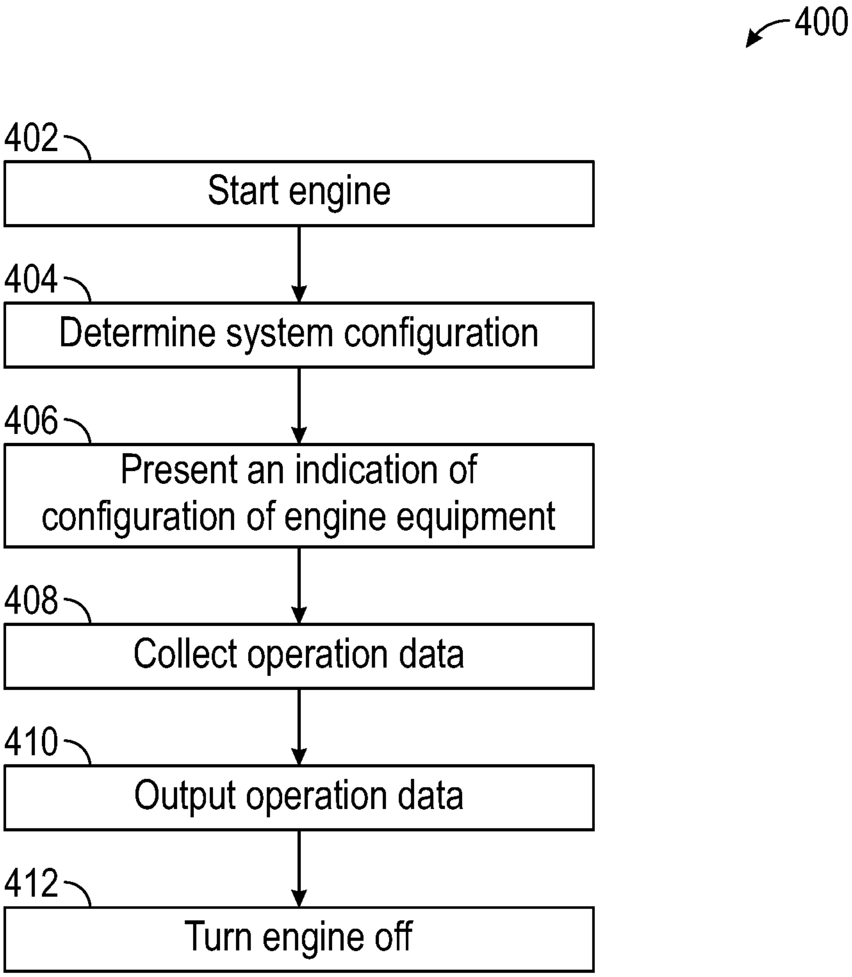
FIG. 19 is a flow diagram of a method for operating an engine compliance verification system.

Referring particularly to FIG. 19, a method 400 for operating an engine is shown, according to some embodiments. In some embodiments, the method 400 includes steps 402-412. The method 400 can be performed by ignition controller 248 and may be performed using some or all of the functionality and components of engine 100 and ignition system 200.

The method 400 includes starting an engine (e.g., the engine 100), according to some embodiments. For example, a user may manually (e.g., via a recoil starter) or electronically (e.g., via a turnkey ignition, push-button ignition, etc.) start the engine 100 (step 402). In some embodiments, the ignition controller 248 is configured to selectively operate the ignition coil assembly 210 to selectively facilitate starting the engine 100. For example, a user may provide a user input to the user interface 302 (e.g., actuate a button, flip a switch, type a password, etc.) to enable a spark being provided to the engine 100 (e.g., by enabling the ignition coil device 202 to output the high voltage signal). In some embodiments, the ignition controller 248 may facilitate an operator setting an electronic lock (e.g., via a digital passcode, a digital password, a digital key, or other user identification and authorization technique). In some embodiments, the ignition controller 248 receives a key (e.g., the set digital passcode, password, key, etc.) that can disable the electronic lock. In some embodiments, the electronic lock prevents a spark being generated at the spark plug 208 and/or limits the rotational speed of the engine 100 (e.g., limited to an idle speed). In some embodiments, the electronic lock reduces the likelihood of unauthorized operation of the equipment and can provide for enhanced engine performance analysis and operation. For example, the ignition controller 248 may retrieve (e.g., front the rules database 298, from the operation data database 294, etc.) and apply various user profiles (e.g., rules, settings, software profiles, setting profiles, etc.) for operating the ignition system 200 based on the password. For example, the kart 10 may be used by a first user or category of user (e.g., a child, junior, novice, professional, adult, owner, borrower, custom category of user, etc.) that may be associated with a particular passcode, key, combination, etc., that may be stored in the memory 286. Continuing this example, when the ignition controller 248 receives the passcode (e.g., via the user interface 302, via the user device 288, etc.), the rules manager 299 may retrieve rules from the rules database 298 that are associated with the passcode, that can dictate one or more functions of the ignition system 200 (e.g., spark advance, spark timing, spark duration, RPM limit, etc.). In this way, a set of rules may be retrieved and utilized for the first user or category of user. Continuing this example, a same or different user or category of user may be associated with a different passcode, key, combination, etc., that may be stored in the memory 286. In this example, when the ignition controller 248 receives the different passcode (e.g., via the user interface 302, via the user device 288, etc.) the rules manager 299 may retrieve a same or different set of rules from the rules database 298 that can dictate one or more functions of the ignition system 200 (e.g., spark advance, spark timing, spark duration, RPM limit, etc.). In this way, a first user may operate the engine 100 using a first software profile (e.g., a first set of setpoint values), and a second user may operate the engine 100 using a second software profile (e.g., a second set of setpoint values).

In some embodiments, the first software profile and the second software profile correspond to operating ignition functions of the ignition system 200 (e.g., spark timing, RPM, etc.) identically, and a data tag (e.g., a user tag) is applied to data collected by the operation data manager 296 during subsequent operation of the engine 100 by the respective user. In this way, the performance of the engine 100 can be traceable and customizable to a respective one of one or more users. In some embodiments, the memory 286 maintains one or more user profiles, and based on an input (e.g., digital key, passcode, button, code, message, etc.) provided to the memory 286, a respective one of the one or more user profiles is applied to the rules manager 299. In some embodiments, memory 286 maintains one user profile, and the one user profile may be automatically applied to the rules manager 299 when the ignition controller 248 receives power (e.g., from the initiation coil 250, from an energy storage device, from a battery, etc.). In some embodiments, the user profiles may be structured and stored such that the various data attributes of the profile are not user-modifiable. In other words, some or all of the setpoint values attributed to the user profiles may be stored on an inflexible memory (e.g., read-only memory) that maintains an image including the user profiles and cannot be reprogramed.

The method 400 includes determining a system configuration (step 404). In some embodiments, the ignition controller 248 is configured to analyze one or more data values stored in the operation data database 294 to determine a setting and configuration of the ignition system 200 and/or engine 100. For example, the ignition controller 248 may retrieve and apply one or more user profiles (e.g., a set of one or more rules, settings, etc.) for operating the ignition system 200 based on an input from a user. Based on the user profile, the system may apply a rule for characterizing a value or a group of values corresponding to the settings and values applied by the user profile. For example, a user profile may include a setpoint for an engine RPM limit (e.g., 2000 RPM, 4100 RPM, 6100 RPM, 7100 RPM, 7500 RPM, 12000 RPM, etc.), and a spark ignition timing (e.g., dynamic, fixed, 5 degrees BTDC, etc.). Based on the value of the engine RPM limit and/or the ignition timing method applied based on the user input, the ignition controller 248 may generate a characterization of the inputs. In some embodiments, a state of the hardware of the ignition system 200 (e.g., an image stored on a read-only-memory) and/or a state of the software of the ignition system 200 are determined (e.g., a state indicating an applied user profile) to characterize the system configuration.

In some embodiments, the user profile is selected by a computing system associated with an administrator (e.g., race administrator, etc.). For example, a passcode, key, signal, etc., may be applied to one or more ignition controller 248 that are subject to one or more shared regulations via the communications interface 282. The passcode, key, signal, etc., may unlock the electronic lock. In some embodiments, a transmitter may be positioned proximate a starting line of a racetrack (e.g., track 26), which may be configured to broadcast or communicate a passcode, key, signal, etc., that can be received by one or more ignition controller 248 proximate the transmitter (e.g., within a geofenced location, within a signal range of the transmitter, etc.). Continuing this example, when the one or more ignition controller 248 proximate to the transmitter receive the passcode, key, signal, etc., from the transmitter, the one or more ignition controller 248 may select a user profile based on the received passcode, key, and/or signal. Continuing this example, the transmitter may receive a signal from the one or more ignition controller 248 proximate the transmitter to determine the user profile of the ignition controller 248. In some embodiments, the transmitter and associated data processing system (e.g., external data administration system 292) may determine whether identical engine performance configurations (e.g., RPM limits, spark advance setpoint, etc.) are applied by the one or more ignition controller 248. In some embodiments, a first passcode, key, signal, etc., is provided to the ignition controller 248 by a user to unlock an electronic lock, and a second passcode, key, signal, etc., is provided to the ignition controller 248 by an administrator computing system (e.g., external data administration system 292). In such embodiments, the first passcode, key, signal, etc., may enable a spark being supplied to the engine (e.g., to digitally unlock the ignition system 200) and/or initiate data tagging (e.g., user tagging), and the second passcode, key, signal, etc., may cause the ignition controller 248 to retrieve and/or apply a user profile associated with the second passcode, key, signal, etc. In such embodiments, the second passcode, key, signal, etc., dictates the setpoint value for one or more control variables of the ignition system 200 (e.g., spark timing, RPM limit, etc.).

In some embodiments, the user profile is associated with a particular ignition system 200. For example, the first ignition system 200 may maintain only a single user profile that dictates the control variable values (e.g., maximum engine speed to be provided by the ignition coil device 202, a spark timing, a data output protocol, etc.) for controlling the ignition system 200, and a second ignition system 200 may maintain only a second user profile that dictates the control variable values for controlling the ignition system 200. Continuing this example, the first user profile may be different (e.g., have a different maximum engine speed) than the second user profile, and a user may substitute either the first ignition system or the second ignition system to effectively modify the user profile, and thereby modify the performance of the engine 100 being controlled by the implemented ignition system (e.g., the installed first ignition system or the second ignition system). In such examples, the indicator 262, LED 264, and/or color of the housing 260 may indicate the maximum engine speed to be provided by the ignition coil device (e.g., 4,100 RPM, 6100 RPM, 7100 RPM, 7500 RPM, 12000 RPM, etc.). In some embodiments, the maximum engine speed to be provided by the ignition coil device 202 is a limit that is less than a maximum speed limit specified by the engine manufacturer. For example, the engine 100 may be physically limited to a high RPM, e.g., 14,000 RPM, whereas the maximum engine speed to be provided by the ignition coil device 202 may be less than the high RPM (e.g., (e.g., 4,100 RPM, 6100 RPM, 7100 RPM, 7500 RPM, 12000 RPM). In this way, the engine 100 may be physically capable of a higher speed (e.g., a higher RPM) than the limit established by the ignition coil device 202.

The method 400 includes generating a message indicating a configuration of the system (step 406). In some embodiments, the ignition controller 248 presents the message via the user interface 302, indicator 262, user device 288, and/or external data administration system 292. For example, the message may be presented via one or more light emitting devices, displays, sound emitting devices, and other suitable information output devices. In some embodiments, the message indicating a configuration of the system may be presented continuously or discontinuously during the operation of the engine 100. For example, upon the ignition controller 248 receiving sufficient power to operate the ignition system 200, the ignition controller 248 may present the message via the indicator 262 automatically or based on an input from a user regarding displaying the message.

In some embodiments, the ignition controller 248 may present the message until the ignition controller 248 is unpowered, or may display the message according to a set of rules (e.g., a schedule, program, algorithm) that dictate a conditional display (e.g., duration, timing, etc.) of the message. For example, a rule may include displaying the message for a period of time following a change to the applied user profile (e.g., when a different user profile is selected). In some embodiments, a rule may include displaying the message until a passcode, key, signal, etc., is received by the ignition controller 248, which may indicate that a corresponding compliance task has been completed. For example, a race official may view the message and subsequently provide a password, key, signal, etc., that adjusts (e.g., enables, disables, changes, etc.) the presentation of the message. For example, the race official may view the message and provide a password, key, signal, etc., that causes the ignition controller 248 to turn a light on or off, changes the color of a light (e.g., changes a red light to a green light, etc.), changes a pattern of the light (e.g., flashing pattern to a constant on, updates wording and/or colors displayed on a display, etc.). In some embodiments, the compliance verifier (e.g., race official, etc.) may be a human (e.g., a human race official). In some embodiments, the compliance verifier may be or include artificial intelligence (AI) or computer code (e.g., software) configured to receive the message and compare the message to a target message to verify compliance. For example, a human race official may verify compliance by observing a message in the form of a flashing light, a graphical user interface on a display, via indicator 262, etc., and a software may determine compliance by directly comparing the message (e.g., a digital representation of the configuration, a digital token, a voltage signal, etc.) to a target message or target system configuration.

In some embodiments, the message is presented via a user device 288, external data administration system 292, or other devices communicably coupled to the ignition controller 248. For example, the user device 288 may include a processing circuit configured to receive the message from the ignition controller 248, and display, via a display of the user device 288, the message received from the ignition controller 248. In some embodiments, the external data administration system 292 may be communicably connected to one or more ignition controller 248 (e.g., via network 290) and may display one or more messages from the one or more ignition controller 248.

The method 400 includes collecting operation data (step 408). In some embodiments, the operation data manager 296 is configured to monitor and store sensor data collected by engine sensors 304. For example, the operation data manager 296 may monitor the flywheel sensor 306 and the engine load sensor 308 with respect to time (e.g., via a clock signal of or received by the ignition controller 248). In some embodiments, the control variable values (e.g., the spark ignition timing, spark delay, spark duration, spark advance, etc.) are monitored and/or stored in memory 286. For example, the values and any intervening or intermediate values that dictate the spark ignition timing, spark delay, spark duration, spark advance, etc., may be stored in the operation data database 294. In some embodiments, some or all of the data stored in operation data database 294 (e.g., data relating to the operation of the ignition system 200 and the engine 100), may be structured to facilitate a real-time and/or historical data analysis of the performance of the ignition system 200 and the performance of the engine 100. For example, some or all of the data stored in the operation data database 294 may be associated with a value of an independent variable (e.g., time).

The method 400 includes outputting collected operation data (step 410). In some embodiments, the ignition controller 248 is configured to output a message indicating a current and/or previous state of the equipment 300. For example, the ignition controller 248 may determine a state of the ignition system 200 and engine 100 (e.g., the rotational speed of the engine, the control variable values of the spark advance, the control variable values of crankshaft position, etc.). The ignition controller 248 may be configured to output a message based on the current or previous state of the system. For example, the user interface 302, indicator 262, and/or user device 288 may receive and present a message via an output device. In some embodiments, the user interface 302 includes a display mounted on an exterior surface of the ignition coil device (e.g., on an exterior surface of the housing 260). In some embodiments, operation data stored in the operation data database 294 may be accessible by or transferrable to the user device 288 and/or the external data administration system 292. For example, the ignition controller 248 may be configured to export some or all of the data stored in the operation data database 294. In some embodiments, the user device 288 is configured to facilitate a user performing a visual analysis of operational data.

In some embodiments, operation data is output to the user device 288 in real-time. For example, a determined engine speed, ignition timing value, etc., may be stored in the operation data database 294, and the operation data manager 296 may output the operation data to a user interface 302 and/or a user interface of the user device 288. In some embodiments, the operation data manager 296 may present a graphical user interface of the user interface 302 including some or all of the data stored in the operation data database. For example, the user interface 302 may include a graphical user interface configured to display one or more gauges (e.g., a gauge cluster) and other sensor outputs (e.g., a data table), which may display some or all of the information stored in the operation data database (e.g., engine speed, time, operating time, spark ignition timing, etc.).

The method 400 includes turning the engine off (step 412). In some embodiments, the ignition system 200 is configured to turn the engine 100 off (e.g., prevent a combustion cycle) in response to an input. For example, a user may activate a button, switch, or mechanical disconnect (e.g., a kill switch, etc.) which may physically interrupt an electronic circuit including the ignition coil assembly 210 and the spark plug 208. This may, for example, prevent a spark from being provided to the engine 100 and thereby prevent a combustion event in the combustion chamber (e.g., the space between the top of the piston 108 and the walls of the cylinder 104. In some embodiments, the ignition controller 248 is configured to turn the engine 100 off in response to an input. For example, the ignition controller 248 may receive a message, passcode, signal, key, etc. and interrupt an electronic circuit including the spark plug 208 and ignition coil assembly 210. For example, the ignition controller 248 may actuate a switching device configured to electronically decouple the sparkplug from the secondary coil 216. In some embodiments, the ignition coil assembly 210 receives a flow of current from the capacitor 252. In such embodiments, the primary coil 214 may experience a flow of energy based on energy discharged from the capacitor, an induced electromotive force (EMF) due to magnetic flux in the magnetic core 212, or a combination of energy discharged from the capacitor 252 and the induced EMF. In some embodiments, the energy in the primary coil 214 is based entirely or predominantly on the energy discharged by the capacitor 252, and the high voltage signal output by the ignition coil device 202 can be controlled by controlling the capacitor 252. For example, the ignition coil leg 244 may be made of nonmagnetic material (e.g., a polymer), which may cause the ignition coil leg 244 to not induce a current in the primary coil 214 when the flywheel 112 rotates, and the capacitor 252 may provide the energy to the primary coil 214 to provide the spark to the engine 100 (e.g., a pulse of energy in the primary coil 214 which induces a high voltage in the secondary coil 216 that subsequently arcs in a space between the electrodes of the spark plug 208). In such embodiments, the ignition controller 248 may selectively facilitate or inhibit a discharge of energy from the capacitor 252 to the primary coil 214 based on the input (e.g., a command to turn the engine 100 off).

In some embodiments, the ignition controller 248 may receive the input to turn the engine 100 off from the user interface 302 and/or the user device 288. For example, a user, administrator, race official, etc., may interact with the user interface 302 and/or user device 288 (e.g., provide a user input) to command the ignition controller 248 to prevent a spark from being generated in the engine 100. Continuing this example, the ignition controller 248 may inhibit or prevent a discharge of energy from the capacitor 252 to the primary coil 214 and/or cause a switching device to interrupt an electronic circuit including the secondary coil 216 and the spark plug 208. In this way, the engine 100 may be turned off remotely (e.g., via an input received by a user device 288 spaced from the engine 100), and/or locally (e.g., via actuation of a kill switch or mechanical interrupt device coupled to the engine 100 or kart 10). In some embodiments, the rules manager 299 and external devices and systems (e.g., external data administration system 292, user device 288, etc.) may generate the input to turn off the engine 100 based on one or more criteria. For example, rules manager 299 may receive sensor data from the engine sensors 304 and a time signal (e.g., a clock signal, a date, an elapsed engine operating time, etc.) from the operation data manager 296. In response to a determination that sensor data of the engine sensors 304 and/or the time signal does not comply with one or more criteria (e.g., according to one or more rules stored in the rules database 298), the external devices and systems may generate the input to cause the ignition controller 248 to prevent the engine 100 from receiving one or more sparks.

In some embodiments, the ignition controller 248 receives location information from a positioning device (e.g., a global positioning system, a global positioning system of the user device 288, etc.), and the rules manager 299 may apply the location information to one or more rules stored in the rules database 298. In such embodiments, if the location information is determined to not comply with a location-based criteria (e.g., according to a rule stored in the rules database 298), the rules manager 299 may generate the input to turn the engine 100 off. For example, if a kart 10 is being operated outside of a geographical boundary (e.g., as dictated by a geofence or other software-based location boundary), the ignition controller 248 may prevent one or more sparks. In this way, location information may be utilized as a criterion for generating the input to turn off the engine 100, according to some embodiments.

In some embodiments, after an input to turn off the engine 100 is received by the ignition controller 248, the operation data manager 296 outputs operation data stored in the operation data database 294 to a memory device that remains powered independently of the engine 100 rotational speed. For example, when the flywheel 112 stops rotating, some or all of the ignition controller 248 may be unpowered or non-functional. The operation data manager 296 may output operation data of the operation data database 294 to a memory of the user device 288, a memory of the external data administration system 292, a cloud-based memory, a non-volatile memory, or other memory device prior to some or all of the ignition controller 248 becoming unpowered. In some embodiments, the operation data manager 296 may output operation data of the operation data database 294 to a memory of the user device 288 periodically during the operation of the engine 100, and the operation data manager 296 may, in response to the input to turn off the engine 100, output the operation data. For example, the operation data manager 296 may output operation data from the operation data database 294 according to a schedule (e.g., once every 10 seconds, once every 30 seconds, once every 1 second, etc.), and once the input to turn off the engine 100 is received between scheduled data output events, the operation data manager 296 may output the cumulative or elapsed period-specific operation data. For example, operation data manager 296 may output some or all of the collected operation data or may only output the operation data that was not communicated by the prior scheduled data output event. In this way, the quantity of data in transfer following the input to turn off the engine 100 may be smaller than the size of the collected operation data stored in the operation data database 294, which may facilitate a relatively quick data transfer upon receiving the input to turn the engine 100 off.

In some embodiments, the input to turn the engine 100 off is detected by the ignition controller 248. For example, a user may actuate an actuator (e.g., a button, switch, a kill switch) etc., to mechanically interrupt an electrical circuit (e.g., between the ignition coil assembly 210 and the spark plug 208) to prevent the engine 100 from receiving a spark. The ignition controller 248 may detect that the engine 100 is not receiving a spark (e.g., by detecting a decrease in the rotational speed of the flywheel 112 below an idle speed, etc.), and may output operation data. In some embodiments, an energy storage device (e.g., capacitor 252) is configured to power some or all of the ignition controller 248 for a period of time (e.g., 30 seconds, 5 minutes, 30 minutes, 2 hours, 3 days, 1 month, etc.) after the flywheel 112 stops rotating. In such embodiments, the period of time may facilitate one or more data transfers (e.g., of operation data, firmware updates, software updates, updates to rules database 298, updates to operation data database 294, etc.) between the devices connected to the communications interface 282 (e.g., user device 288, external data administration system 292, etc.) and the memory 286 after the input to turn the engine 100 off is detected by the ignition controller 248. In some embodiments, the memory 286 is or includes a portable memory device (e.g., memory stick, thumb drive, SD memory card, solid-state drive, etc.). In such embodiments, some or all of the operation data of the operation data database 294 may be copied to or stored on the portable memory device. In such embodiments, outputting the operation data stored in the operation data database 294 may optionally include a user decoupling the portable memory device from the ignition controller 248 and inserting the memory into a data processing system configured to receive the portable memory device and data stored thereon (e.g., the user device 288, external data administration system 292, etc.).

In some embodiments, upon receiving the input to turn the engine 100 off, the flywheel 112 may cease rotation, and the ignition controller 248 may become unpowered. A user may access some or all of the memory (e.g., the operation data stored in the operation data database 294) via the communications circuit when the memory 286 is powered and/or unpowered. As described above, some or all of the memory 286 may be nonvolatile memory. For example, a user may connect a data processing system (e.g., the user device 288) to the memory 286 via the communications interface 282 via one or more data cables (e.g., twisted pair, coax, fiber optic, Ethernet cable, serial cable, universal serial bus cable, lightning cable, a 3 mm cable, etc.) to access some or all of the memory 286.

In some embodiments, some or all of the operation data database 294 may be stored on a volatile memory (e.g., a temporary memory) that temporarily stores operation data prior to an export of the operation data, which is lost, erased, deleted, forgotten, etc., upon the memory 286 becoming unpowered. In some embodiments, the operation data database 294 is a repository of operation data over one or more engine on/off cycles.

In some embodiments, the ignition controller 248 is configured to output a report related to the operation of the engine 100. For example, the operation data manager 296 may generate a report based on the operation data stored in the operation data database 294. In some embodiments, the report describes various functions and data of the ignition system 200 (e.g., ignition timing, rotational speed, engine load, etc.) during the operation of the engine 100. In some embodiments, the operation data manager 296 is configured to generate the report in response to the input to turn off the engine 100. In some embodiments, the ignition controller 248 and/or a data processing system of the user device 288 may generate a report (e.g., a performance summary, a performance analysis, etc.) based on operation data collected by the operation data manager 296 and/or operation data stored in the operation data database 294. In some embodiments, the report is stored in the memory 286. In some embodiments, the report is presented on the user interface 302 and/or a user interface (e.g., display) on the user device 288.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the ignition system 200 as shown in the various exemplary embodiments is illustrative only. Additionally, any element disclosed in one embodiment may be incorporated or utilized with any other embodiment disclosed herein. It should be appreciated that other elements of the various embodiments may be incorporated or utilized with any of the other embodiments disclosed herein.

What is claimed is:

1. An ignition coil for an internal combustion engine, comprising:

an ignition circuit including a first winding and a second winding, the ignition circuit being configured to output an ignition timing signal;

a controller in communication with the ignition circuit, the controller configured to establish a rule that limits an engine speed to a maximum engine speed to be provided by the ignition timing signal; and a light configured to illuminate and indicate the maximum engine speed in response to an output signal from the controller.

2. The ignition coil of claim 1, wherein the light illuminates in at least one of a pattern or a color based on the maximum engine speed.

3. The ignition coil of claim 2, further comprising a housing enclosing the first winding and the second winding;

wherein a color of the housing indicates the maximum engine speed.

4. The ignition coil of claim 3, wherein the light illuminates in the color of the housing.

5. The ignition coil of claim 3, wherein the light is coupled to the housing.

6. The ignition coil of claim 2, wherein the light illuminates in a blinking pattern based on the maximum engine speed to be provided by the ignition timing signal.

7. The ignition coil of claim 6, wherein the maximum engine speed is one of: 4100 rotations per minute, 6100 rotations per minute, 7100 rotations per minute, 7500 rotations per minute, or 12000 rotations per minute.

8. The ignition coil of claim 2, wherein the controller is further configured to determine a timing for generating the ignition timing signal; and further comprising a second light, the second light configured to illuminate to indicate the timing.

9. The ignition coil of claim 1, further comprising a speed detection circuit configured to detect the engine speed, and wherein the controller is configured to:

determine the engine speed; and output, via a communication circuit, the engine speed.

10. The ignition coil of claim 9, wherein the controller is configured to output the engine speed via a wireless connection.

11. The ignition coil of claim 9, wherein the controller is configured to:

store a plurality of determined engine speeds;

determine whether the engine is running; and based on a determination that the engine is not running, output at least one of the plurality of determined engine speeds.

12. An engine, comprising:

an engine block having a cylinder defining a cylinder axis;

a crankshaft defining a crankshaft axis;

a piston configured to reciprocate along the cylinder axis and drive the crankshaft about the crankshaft axis;

a flywheel coupled to the crankshaft and comprising a magnet;

an ignition system configured to generate a spark, the ignition system including:

an ignition circuit having a first winding and a second winding, the ignition circuit being configured to output an ignition timing signal, the first winding being positioned proximate the flywheel;

an indicator; and a controller in communication with the first winding and configured to:

establish a rule that limits an engine speed to a maximum engine speed to be provided by the ignition timing signal; and present, via the indicator, information regarding the maximum engine speed to be provided by the ignition timing signal.

13. The engine of claim 12, wherein the indicator includes a display, and wherein the controller is configured to present, via the display, information regarding the maximum engine speed to be provided by the ignition timing signal.

14. The engine of claim 13, wherein the controller is configured to facilitate a wireless connection to the indicator.

15. The engine of claim 12, further comprising a speed sense circuit configured to detect a speed of the engine;

wherein the controller is configured to:

obtain the speed of the engine;

based on the speed of the engine, obtain a setpoint value that establishes a timing for controlling the ignition circuit to output the ignition timing signal;

operate the ignition circuit based on the setpoint value and the maximum engine speed; and display, via the indicator, information regarding at least one of the speed of the engine, the setpoint value, or the maximum engine speed to be provided by the ignition timing signal.

16. The engine of claim 12, further comprising a speed sense circuit configured to detect a speed of the engine;

wherein the controller is configured to:

determine the speed of the engine;

store a plurality determined engine speeds;

determine whether the engine is running; and based on a determination that the engine is not running, output at least one of the plurality determined engine speeds to the indicator.

17. The engine of claim 16, wherein the controller is configured to:

based on a determination that the engine is running, obtain a setpoint value for a timing for outputting the ignition timing signal;

wherein the controller is configured to present, via the indicator, at least one of the speed of the engine, the setpoint value, or the maximum engine speed to be provided by the ignition timing signal.

18. A method for operating an engine, comprising:

establishing, via a processing circuit of an ignition coil, a rule for limiting an engine speed to a setpoint value;

presenting, via a user interface of the ignition coil, information regarding the setpoint value; and operating, via the processing circuit of the ignition coil, an ignition circuit based on the setpoint value, wherein the ignition circuit is configured to generate an ignition signal.

19. The method of claim 18, further comprising:

determining, via the processing circuit, a speed of the engine and a second setpoint value for controlling a timing for generating the ignition signal;

storing, via the processing circuit, the speed of the engine; and presenting, via the user interface, at least one of the setpoint value, the second setpoint value, or the speed of the engine.

20. The method of claim 18, further comprising:

determine the engine speed;

storing a plurality determined engine speeds;

determining whether the engine is running; and based on a determination that the engine is not running, outputting at least one of the plurality determined engine speeds to the user interface.

* * * * *